US008248886B2

(12) United States Patent
Neelamani et al.

(10) Patent No.: US 8,248,886 B2
(45) Date of Patent: Aug. 21, 2012

(54) SEPARATION AND NOISE REMOVAL FOR MULTIPLE VIBRATORY SOURCE SEISMIC DATA

(75) Inventors: Ramesh Neelamani, Houston, TX (US); Christine Krohn, Houston, TX (US); Jerry Krebs, Houston, TX (US); Max Deffenbaugh, Califon, NJ (US); John Anderson, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 398 days.

(21) Appl. No.: 12/531,271

(22) PCT Filed: Mar. 19, 2008

(86) PCT No.: PCT/US2008/003599
§ 371 (c)(1),
(2), (4) Date: Sep. 14, 2009

(87) PCT Pub. No.: WO2008/123920
PCT Pub. Date: Oct. 16, 2008

(65) Prior Publication Data
US 2010/0097888 A1    Apr. 22, 2010

Related U.S. Application Data

(60) Provisional application No. 60/922,591, filed on Apr. 10, 2007.

(51) Int. Cl.
*G01V 1/00* (2006.01)
(52) U.S. Cl. .............................. 367/73; 367/31; 702/14
(58) Field of Classification Search .................... 367/46, 367/48, 21, 23, 41, 49, 189; 181/111; 702/14, 702/17, 97, 179
See application file for complete search history.

(56) References Cited

U.S. PATENT DOCUMENTS 4,168,485 A    9/1979 Payton et al. ................... 367/41
(Continued)

FOREIGN PATENT DOCUMENTS

WO    WO 02/33442    4/2002
(Continued)

OTHER PUBLICATIONS

Becquey, M. et al. (2002) "Pseudo-Random Coded Simultaneous Vibroseismics," *SEG Int'l Expo. 72nd Annual Mtg.*, Salt Lake City, Utah, 4 pages.

(Continued)

*Primary Examiner* — Jack W Keith
*Assistant Examiner* — Daniel L Murphy
(74) *Attorney, Agent, or Firm* — ExxonMobil Upstream Research Company Law Dept

(57) ABSTRACT

The invention discloses a way to recover separated seismograms with reduced interference noise by processing vibroseis data recorded (or computer simulated) with multiple vibrators shaking simultaneously or nearly simultaneously (200). A preliminary estimate of the separated seismograms is used to obtain improved seismograms (201). The preliminary estimate is convolved with the vibrator signature and then used to update the seismogram. Primary criteria for performing the update include fitting the field data and satisfying typical criteria of noise-free seismograms (202). Alternative ways to update are disclosed, including signal extraction, modeled noise extraction, constrained optimization based separation, and penalized least-squares based separation. The method is particularly suited for removing noise caused by separating the combined record into separate records for each vibrator, and is advantageous where the number of sweeps is fewer than the number of vibrators (200).

22 Claims, 17 Drawing Sheets

U.S. PATENT DOCUMENTS

| | | | |
|---|---|---|---|
| 4,707,812 A | 11/1987 | Martinez | 367/46 |
| 5,400,299 A | 3/1995 | Trantham | 367/38 |
| 5,550,786 A | 8/1996 | Allen | 367/48 |
| 5,572,483 A | 11/1996 | Chambers et al. | 367/45 |
| 5,715,213 A * | 2/1998 | Allen | 367/48 |
| 5,721,710 A | 2/1998 | Sallas et al. | 367/41 |
| 6,327,537 B1 | 12/2001 | Ikelle | 702/14 |
| 6,381,505 B1 | 4/2002 | Kassmann et al. | 700/44 |
| 6,519,533 B1 | 2/2003 | Jeffryes | 702/17 |
| 6,603,707 B1 | 8/2003 | Meunier et al. | 367/49 |
| 6,704,245 B2 | 3/2004 | Becquey | 367/39 |
| 6,882,958 B2 * | 4/2005 | Schmidt et al. | 702/179 |
| 7,050,356 B2 | 5/2006 | Jeffryes | 367/41 |
| 7,184,992 B1 | 2/2007 | Polyak et al. | 706/46 |
| 2006/0002504 A1 | 1/2006 | DeMan et al. | 378/4 |
| 2006/0158962 A1 | 7/2006 | Jeffryes | 367/41 |
| 2006/0250891 A1 | 11/2006 | Krohn | 367/38 |
| 2007/0274155 A1 | 11/2007 | Ikelle | 367/38 |

FOREIGN PATENT DOCUMENTS

| | | |
|---|---|---|
| WO | WO 2004/031806 | 4/2004 |
| WO | WO 2004/095073 | 11/2004 |
| WO | WO 2005/019865 | 3/2005 |
| WO | WO 2005019865 A2 * | 3/2005 |
| WO | WO 2008/123920 | 10/2008 |
| WO | WO 2009/051900 | 4/2009 |

OTHER PUBLICATIONS

Bjorck, A. (1996) *Numerical Methods for Least Squares Problem,* SIAM, Chapter 7.

Candes, E.J. et al. (2002) "Recovering Edges in Ill-Posed Inverse Problems: Optimality of Curvelet Frames," *Annals of Statistics* 30, pp. 784-842.

Cormode, G. et al. (2005) "Towards an Algorithmic Theory of Compressed Sensing", *DIMACS Tech. Report* 2005-25, 17 pages.

Efron, B. et al. (2004) "Least Angle Regression", *Ann. Statist.* 32(2), pp. 407-499.

Krohn, C. et al. (2006) "HFVS™: Enhanced Data Quality Through Technology Integration," Geophysics, 71.2, pp. E13-E23.

Mallat, S. (1998) *A Wavelet Tour of Signal Processing,* Academic Press, pp. 409, 412, 441-446.

Mallat, S. (1998) *A Wavelet Tour of Signal Processing,* Academic Press, pp. 220-310.

O'Leary, D. (2001) "Near-Optimal Parameters for Tikhonov and Other Regularization Methods," *SIAM Journal of Scientific Computing* 23, pp. 1161-1171.

Sheriff, R. E. (2002) *Encyclopedic Dictionary of Applied Geophysics,* 4$^{th}$Ed., p. 67, 69, 211, 247.

* cited by examiner

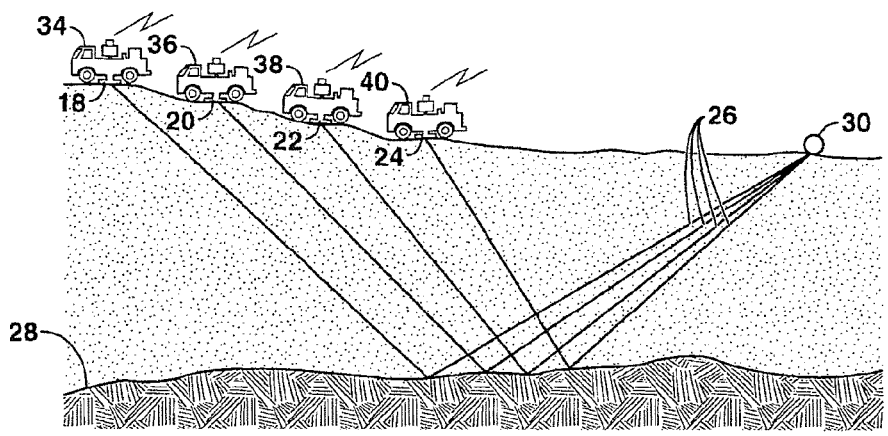
FIG. 1
*(Prior Art)*
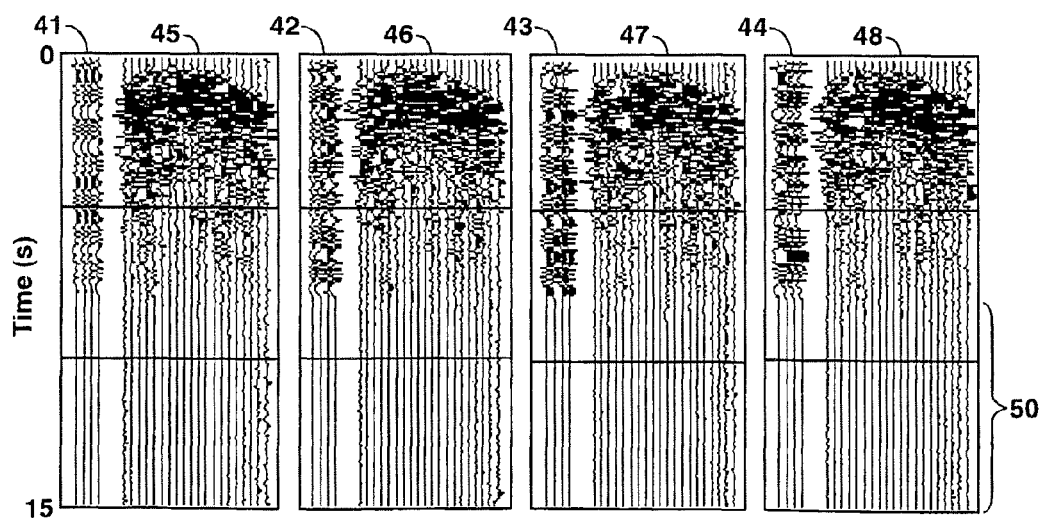
| FIG. 2A | FIG. 2B | FIG. 2C | FIG. 2D |
| :---: | :---: | :---: | :---: |
| *(Prior Art)* | *(Prior Art)* | *(Prior Art)* | *(Prior Art)* |

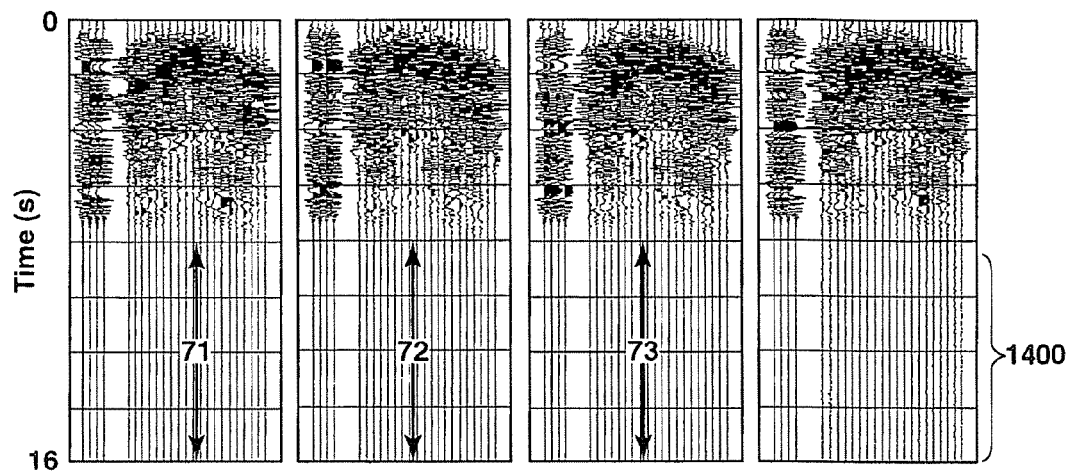
*FIG. 15A*  *FIG. 15B*  *FIG. 15C*  *FIG. 15D*
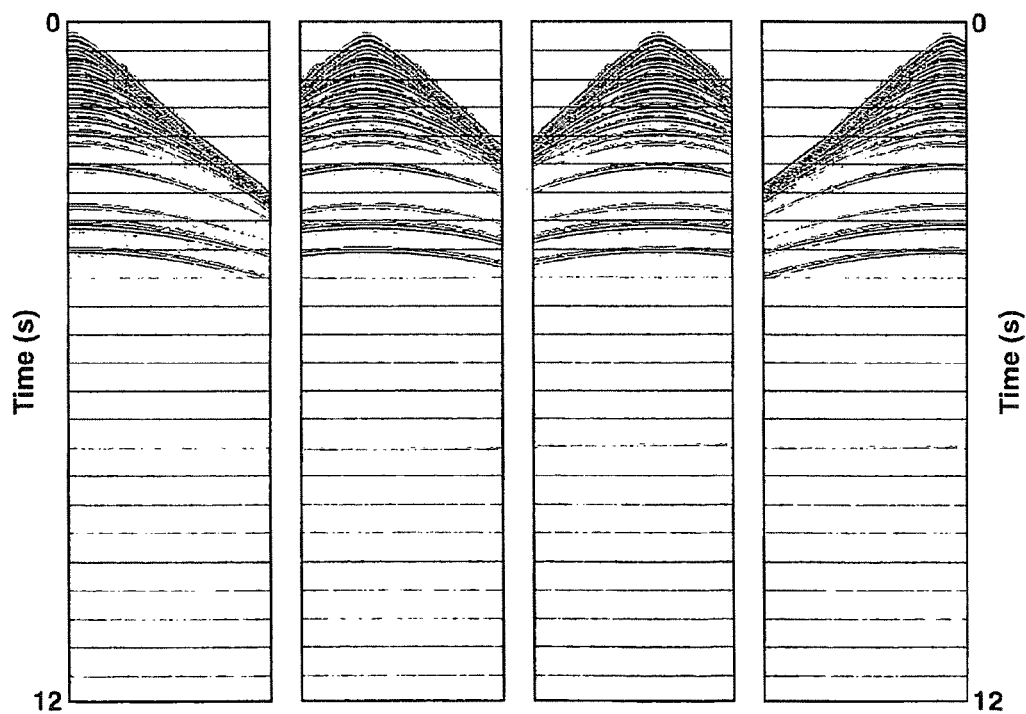
*FIG. 16A*  *FIG. 16B*  *FIG. 16C*  *FIG. 16D*

SEPARATION AND NOISE REMOVAL FOR MULTIPLE VIBRATORY SOURCE SEISMIC DATA

CROSS-REFERENCE TO RELATED APPLICATIONS

This application is a National Stage entry under 35 U.S.C. 371 of PCT/US2008/003599 that published as WO 2008/123920 and was filed on Mar. 19, 2008 and claims the benefit of now expired U.S. Provisional application 60/922,591 which was filed on Apr. 10, 2007.

FIELD OF THE INVENTION

This invention relates generally to the field of geophysical prospecting and, more particularly, to seismic data processing. Specifically, the invention is a method for separating the responses for two or more seismic vibrators operating simultaneously, and removing noise from those data records.

BACKGROUND OF THE INVENTION

Acquisition methods, in which multiple seismic vibratory sources, commonly called vibrators, are operated at the same time and the separate seismic seismograms then recovered, can considerably reduce the time it takes to record vibroseis data thereby reducing the cost of acquiring seismic surveys. Similarly, computer modeling of multiple source data followed by recovery of the separate seismograms from the modeled data is a computationally efficient alternative to simulating separate seismograms. However, the seismograms obtained from such acquisition methods are contaminated by more noise than seismograms obtained from surveys in which single vibrators are used alone, or from surveys in which multiple vibrators and multiple sweeps, with the number of sweeps greater than or equal to the number of vibrators, are used. The additional noise, termed interference noise, arises because multiple seismograms need to be recovered or separated from a smaller number of vibroseis field records, so that a separate seismogram for each individual vibrator is obtained. As may be expected, the computer-simulated seismograms also suffer from the aforementioned interference noise problem.

Vibrator Field Records and Seismograms

Seismic vibrators have long been used in the seismic data acquisition industry to generate the acoustic signals needed in geophysical exploration. The conventional use of vibrators involves several well-understood steps. First, one or more vibrators are located at a source point on the surface of the earth or one or more marine vibrators are deployed in water. Second, the vibrators are activated for several seconds, typically ranging from four to thirty-two, with a pilot signal. The pilot signal is typically a sweep function that varies in frequency during the period of time in which the vibrators are activated. Third, seismic receivers are used to receive and record response data for a period of time equal to the sweep time plus a listen time. Typically, the listen time is greater than the time needed for the seismic wave to travel to the deepest target of interest, reflect from the target of interest and travel to the detectors. The response data measured and recorded vs. time at each receiver is called a trace and the group of traces is called a record. The period of time over which data are recorded includes at a minimum the sweep plus the time necessary for the seismic signals to travel to and reflect off of the target reflectors of interest and for the reflected signals to return to the receivers. Fourth, seismograms, similar to those recorded with impulsive sources, are conventionally generated by cross correlating the recorded data with either the pilot signal or a reference sweep. Fifth, the sweep and correlation steps are repeated several times, typically four to eight, and the correlations are added together in a process referred to as stacking, the purpose of which is to enhance signals and reduce noise. Finally, the vibrators are moved to a new source point and the entire process is repeated.

A useful construct in considering this application of seismic vibrators is the standard convolutional model (Sheriff, Encyclopedic Dictionary of Applied Geophysics, 4$^{th}$ Ed., 67 (2002)). This model represents each seismic trace as a convolution of the earth reflectivity function or earth impulse response with a seismic wavelet. The process of convolution is equivalent to the process of applying a filter and is designated with the symbol ⊛. In the case of a seismic vibrator, a field data trace d(t) can be represented by the convolution of the earth response e(t) with the sweep function s(t), which is several seconds long, plus noise n(t), $$d(t)=s(t)\circledast e(t)+n(t) \qquad (1)$$

Thus, field records can be considered as a superposition of multiple reflections of the sweep function with the reflections occurring at different times. In the frequency domain, Equation 1 becomes $$D(f)=S(f)E(f)+N(f) \qquad (2)$$

In Equation 2, capital lettered symbols such as S(f) denote the Fourier transforms of the respective small lettered symbols such as s(t).

Other types of geophysical surveys such as electromagnetic surveys and multi-component seismic surveys are also governed by Equations (1) and (2). For example, in electromagnetic surveys, the s(t) in Equation (1) can be a sweep for a dipole source that radiates electromagnetic energy, e(t) would be the earth's diffusive response to the current dipole source, and the measurement d(t) would be an electric field. In multi-component surveys, the s(t) in Equation (1) can be a sweep for a seismic source, e(t) would be the earth's response to the source, and the measurement d(t) would be the particle motion measured along the horizontal and/or vertical direction. A multi-component survey typically means a seismic survey using multiple types of sensors in which each type of sensor measures a different direction of the vector particle motion or the scalar pressure change.

Computer simulations of field records for all types of geophysical surveys are also exactly described by Equations (1) and (2). In computer modeled seismic data, the superposition of multiple reflections (see the s(t)⊛e(t) term in Equation 2) is performed by running a modeling program that mimics the earth's response (for example, by solving a partial differential equation using finite difference method), and the noise term encapsulates the imperfections of the computer modeling. In contrast, during actual field acquisition, the superposition term and noise term in the field records are naturally generated by the earth in response to the vibratory source sweep signals. Further, in the computer modeled case, the sweep function is exactly known. In contrast, during field acquisition, the actual sweep function that probes the earth can differ from the designed pilot sweep (input to the vibratory sources), and hence needs to measured (termed measured ground force below) or inferred.

The invention is explained below mostly in terms of data acquired from actual seismic field operations where multiple, simultaneously operating, seismic vibrators were the source device. However, all concepts disclosed by such examples are equally applicable to all types of geophysical data and their computer-simulation, unless specified. For example, the term seismograms used routinely in the descriptions below would refer to band-limited Green's functions in computer modeling and to measured electromagnetic energy in electromagnetic surveys. In the electromagnetic case, a vibratory source refers to an electromagnetic source (such as a current dipole source) that is active for continuous periods of time.

Ideally, it would be desirable to extract the full bandwidth earth response E(f) from the recorded data D(f). However, this is not possible in practice because the sweeps used in seismic exploration are band-limited. Instead one seeks to extract the earth response that is convolved with known large bandwidth wavelet with much smaller time extent (compared to the time extent of the sweep function). Such an approximation to the earth response is called a seismogram.

In the described application of seismic vibrators, seismograms g(t) are generated by cross correlating the field record traces measured at various receiver locations with the pilot signal or reference sweep. This cross-correlation step computes the similarity between the field record traces and the sweep function and yields an approximation or estimate of the earth reflectivity function. The process of correlation can be written as a convolution filter, in which the filter is the time reverse of the sweep function as in Equation 3.

$$g(t)=s(-t) \otimes d(t)=[s(-t) \otimes s(t)] \otimes e(t)+s(-t) \otimes n(t). \quad (3)$$

In the frequency domain, Equation 3 can be equivalently expressed as $$G(f)=S^*(f)D(f)=[S^*(f)S(f)]E(f)+S^*(f)N(f), \quad (4)$$

where S* is the complex conjugate of S. The resulting seismogram G(f) in Equation 4 is in the form of the convolutional model in which the earth reflectivity function is convolved with a wavelet given by the autocorrelation function [S*(f)S(f)] of the sweep function S(f). The autocorrelation of the sweep function is essentially non-zero for only a few hundreds of milliseconds. Thus, it approximates the wavelet of an impulsive source better than the sweep wavelet, which is several seconds long.

Instead of using the pilot sweeps and correlation filters to obtain the seismograms as in Equation 4, U.S. Pat. No. 5,550,786 to Allen discloses the use of measured motion from accelerometers on the vibrators to derive an inverse filter. Typically, the so-called ground-force signal, which is a mass-weighted sum of measured accelerometer signals on the reaction mass and on the base plate, is used. The ground-force signal is conventionally used in feedback electronics on the vibrator and is a better approximation for the actual sweep signal imparted into the ground because it includes harmonics generated by nonlinearities in the vibrator mechanics and in the soil. Thus, it can be called a vibrator signature. Other sweep signals derived from measurements can also be used, and they can be used to correlate the field record traces or to construct a filter to remove the signature or sweep signals and replace them with a wavelet.

Wavelets other than the sweep autocorrelation wavelet can be used as well. Trantham (U.S. Pat. No. 5,400,299) and Krohn (International Publication No. WO 2004/095073 A2) apply deconvolution filters that remove or divide the vibrator signature S(f) from the data and replace it with the desired wavelet W(f). In the frequency domain, this operation can be expressed using Equations 5 and 6.

$$G(f)\left[\frac{W(f)}{S(f)}\right]D(f) = \left[\frac{W(f)}{S(f)}\right]S(f)E(f)+\left[\frac{W(f)}{S(f)}\right]N(f); \quad (5)$$

$$G(f) = W(f)E(f) + \left[\frac{W(f)}{S(f)}\right]N(f). \quad (6)$$

The desired wavelet can be of the form of the autocorrelation of the sweep or another wavelet with a bandwidth similar to the sweep function. Typically, the wavelet is chosen to be a few hundred milliseconds long, so that the resulting seismogram resembles data recorded with an impulsive source such as dynamite.

Methods to Reduce Time and Cost of Vibroseis Acquisition

The cost of acquiring vibroseis surveys largely depends on the time it takes to record the survey, which is in turn determined by the time required to record data at each source station. The recording time at each source station depends on the number of sweeps, the sweep length, and the listen time. The listening time (Sheriff, page 211) is the time after the cessation of the vibrator sweep until the end of the record. This time must be long enough for the last vibration to travel from the source through the earth formation to the receiver. For example, if four 8-second sweeps are performed and each sweep has a 7-second listening time, then at least 60 seconds are required to record data at each station. If multiple stations are recorded simultaneously, or if a single sweep is used instead of multiple sweeps, or if the listening times for which the vibrators are idle between sweeps are reduced or eliminated, then less time would be needed for recording the survey. Consequently, the overall cost of the survey would be reduced. While such methods can be used to record data in less time, often the quality of the separated seismograms is worse than that obtained from data recorded with one station at a time with multiple sweeps.

During computer modeling of field records, a key metric is to minimize the total computational cost for computing all the separate seismograms. As expected, all factors identified above that minimize the cost of acquisition of vibroseis surveys also minimize the computational cost of computer modeling.

Separation of Multiple Vibrator Records with Number of Sweeps Greater than or Equal to Number of Vibrators When vibrators are located at different stations and when multiple sweeps are recorded, with the number of sweeps greater than the number of vibrators, then individual separated seismograms can be recovered from the field records by the High Fidelity Vibratory Seismic Method ("HFVS") as first described by Sallas, et al. (see, for example, U.S. Pat. No. 5,721,710). The method uses the vibrator signatures (either the pilot or ground-force signals) for to each vibrator and for each sweep and solves a set of linear equations to design an optimal filter that separates the earth response for each vibrator. As long as there is at least the same number of sweeps and records as the number of unknowns (earth responses for each vibrator), then the solution is well posed. A filter that optimally separates the data into the different seismograms can be found. Consequently, noises arising due to interference between the different seismograms being simultaneously acquired are small.

The HFVS method is more fully described in association with FIG. 1, which depicts typical land-based data acquisition system geometry. FIG. 1 shows four vibrators 18, 20, 22, and 24, mounted on vehicles 34, 36, 38, and 40. The four different signatures transmitted into the ground during sweep i may be called $s_{i1}$, $s_{i2}$, $s_{i3}$, $s_{i4}$. The sweeps for each vibrator are designed to differ, typically in the phase of the sweep. Each signature is convolved with a different earth reflectivity sequence $e_1$, $e_2$, $e_3$, $e_4$ which includes reflections 26 from the interface 28 between earth layers having different impedances (the product of the density of the medium and the velocity of propagation of acoustic waves in the medium). A trace $d_i$ recorded at a geophone 30 is a sum of the signature-filtered earth reflectivities for each vibrator. Formulating this mathematically, data trace $d_i$ recorded for sweep i is:

$$d_i(t) = \sum_{j=1}^{N} s_{ij}(t) \otimes e_j(t) + n_i(t), \tag{7}$$

where $s_{ij}(t)$ equals the sweep i from vibrator j, $e_j(t)$ equals the earth reflectivity seen by vibrator j and $\otimes$ denotes the convolution operator. Equation 7 is based on the convolutional model explained above. This model is a consequence of the concept that each reflected seismic wave causes its own effect at each geophone, independent of what other waves are affecting the geophone, and that the geophone response is simply the sum (linear superposition) of the effects of all the waves. If each sweep $s_{ij}(t)$ is repeated j=1 to M times, then in matrix terms, Equation 7 can be equivalently be expressed as $$\begin{bmatrix} d_1(t) \\ d_2(t) \\ \vdots \\ d_M(t) \end{bmatrix} = \begin{bmatrix} s_{11}(t) & s_{12}(t) & \ldots & s_{1N}(t) \\ s_{22}(t) & s_{22}(t) & \ldots & s_{22}(t) \\ \vdots & \vdots & \ldots & \vdots \\ s_{M2}(t) & s_{M2}(t) & \ldots & s_{M2}(t) \end{bmatrix} \otimes \begin{bmatrix} e_1(t) \\ e_2(t) \\ \vdots \\ e_{N(t)} \end{bmatrix} + \begin{bmatrix} n_1(t) \\ n_2(t) \\ \vdots \\ n_M(t) \end{bmatrix}. \tag{8}$$

Thus, in the HFVS method, N vibrators radiate M≧N sweeps into the earth, resulting in M recorded data records. After the field data are recorded, the HFVS method involves finding an operator, by solving a set of linear equations based on the known M×N vibrator signatures that finds the set of N earth reflectivities that best predict the recorded data. In computer modeling, as expected, when N computer-simulated vibratory sources radiate M≧N sweeps, the computed M data records obtained by running a modeling program are also described using Equation (8).

In the frequency domain, that is, after Fourier transformation, the set of equations represented by Equation 7 can be written as $$D_i(f) = \sum_{j=1}^{N} S_{ij}(f) E_j(f) + N(f). \tag{9}$$

In matrix form, for M sweeps and N vibrators and ignoring the noise term, Equation 8 can be written as $$\begin{bmatrix} S_{11}(f) & S_{12}(f) & \ldots & S_{1N}(f) \\ S_{21}(f) & S_{22}(f) & \ldots & S_{2N}(f) \\ S_{31}(f) & S_{32}(f) & \ldots & S_{3N}(f) \\ S_{41}(f) & S_{42}(f) & \ldots & S_{4N}(f) \\ \vdots & \vdots & \ldots & \vdots \\ S_{M1}(f) & S_{M2}(f) & \ldots & S_{MN}(f) \end{bmatrix} \begin{bmatrix} E_1(f) \\ E_2(f) \\ \vdots \\ E_N(f) \end{bmatrix} = \begin{bmatrix} D_1(f) \\ D_2(f) \\ D_3(f) \\ D_4(f) \\ \vdots \\ D_M(f) \end{bmatrix}. \tag{10}$$

Using vector notations, with overhead→denoting vectors and bold type to denote matrices, Equation 10 can be written as $$S\vec{E} = \vec{D}. \tag{11}$$

When the number of sweeps is greater than or equal to the number of vibrators, the system of simultaneous equations above can be solved for $\vec{E}$. For example, if the number of sweeps is equal to the number of vibrators, then $$\vec{E} = F\vec{D} \tag{12}$$

where F is the filter or operator which when applied to the data separates it into individual vibrator seismograms. The filter F is equal to the inverse of the matrix S $$F = (S)^{-1}. \tag{13}$$

In the presence of noise, the above equality holds only approximately because damped inversion is typically employed especially outside the bandwidth of the sweep. Krohn (PCT Publication No. WO 2004/095073 A2) includes a method to separate the data and shape the data to a desired band-limited wavelet. In the preferred method, which uses a least squares solution, the set of seismograms are $$\vec{G} = WS^*(S^*S)^{-1}\vec{D}, \tag{14}$$

where W is the desired wavelet.

The HFVS method is more fully described in FIGS. 2A-D, which show raw field records for HFVS acquisition. This example illustrates separation with four vibrators and four sweeps. During the first sweep, a group (41) of four vibrator signatures (the disturbances imparted into the ground by each of the four vibrators) are measured by accelerometers on the vibrators. These can differ from the pilot sweep by harmonics caused by the vibrator's mechanical components and their coupling to the ground. Alternatively, signatures may be determined by other near-source measurement, or be estimated, or the vibrator pilot sweep signature may be used in lieu of measurements. In addition, data traces, 45, from a number of geophones are recorded. After the 8-second sweep, the vibrator motion ceases. The record must continue after the cessation of the vibrator motion, 50, so that the last vibration can travel from the source through the earth formation to the receiver. This time is referred to as the listening time. The recordings are repeated three more times so there are four recordings of vibrator signatures (41, 42, 43, 44) and geophone data (45, 46, 47, 48). The sixteen vibrator signatures are used to design a filter that separates the data into four separated seismograms, one for each vibrator location. The separated seismograms for model data are shown in FIGS. 3A-D. Since there are as many data records as there are vibrator locations, the recovered seismograms, 51, 52, 53, 54, are well-separated and there is no interference noise.

Sometimes, multiple fleets of vibrators, with each fleet comprising several vibrators, can be used and separated with the HFVS separation method. In such a case, each fleet would be centered at a different station, and all the vibrators in the same fleet would be operated with identical sweeps. The fleets would be operated simultaneously with a different sweep pattern for each fleet. If there are as many sweeps as there are fleets, then the HFVS separation method can be used to obtain the individual seismograms for each fleet. However, it would not be possible to separate seismograms for the individual vibrators in a fleet because they have the same sweep as the other vibrators in the fleet. The fleet of vibrators would form a source array and there would be one seismogram per fleet at each station.

Separation of Multiple Vibrator Records with Number of Sweeps Fewer than the Number of Vibrators The problem with the HFVS approach is that multiple sweeps are needed with each sweep followed by a listening time when the vibrators are idle. If fewer sweeps or, in the preferred case, one continuous sweep per vibrator can be used, then the data can be recorded in less time. Formulating the acquisition mathematically for a single continuous sweep $s_j$ for each vibrator j=1 to N, a recorded data trace d(t) can be expressed as $$d(t) = \sum_{j=1}^{N} s_j(t) \otimes e_j(t) + n(t). \quad (15)$$

Using matrices, Equation 15 can be rewritten in the time domain as $$d(t) = [s_1(t)\ s_2(t)\ \ldots\ s_N(t)] \otimes \begin{bmatrix} e_1(t) \\ e_2(t) \\ \vdots \\ e_N(t) \end{bmatrix} + n(t), \quad (16)$$

and in the frequency domain as $$D(f) = [S_1(f)\ S_2(f)\ \ldots\ S_N(f)] \begin{bmatrix} E_1(f) \\ E_2(f) \\ \vdots \\ E_N(f) \end{bmatrix} + N(f). \quad (17)$$

Equation 17 is ill-posed. There is only one record or measurement D(f) from which N outputs, $E_1(f)$ to $E_N(f)$, need to be separated. Similarly, as long as the number of measurements, i.e. records, is fewer than the number of unknowns, i.e. outputs or seismograms, the separation is ill-posed. Without additional information, it is not possible to devise a filter that can accurately separate the earth responses for each vibrator. Again, the computed M data records obtained by running a modeling program are also described using Equations (15), (16), and (17).

The standard method for obtaining separated seismograms from actual field data is correlation by the specific sweep function for each vibrator. For example, if the field record is correlated with sweep i to isolate the seismogram from location i the result is $$g_i(t) = s_i(-t) \otimes d(t) \quad (18)$$
$$= [s_i(-t) \otimes s_i(t)] \otimes e_i(t) +$$
$$\sum_{j \neq i, j=1}^{N} [s_i(-t) \otimes s_j(t)] \otimes e_j + s_i(-t) \otimes n(t).$$

In the frequency domain, Equation 18 can be rewritten as $$G_i(f) = S_i*(f)D(f) \quad (19)$$
$$= [S_i*(f)S_i(f)]E_i(f) +$$
$$\sum_{j \neq i, j=1}^{N} [S_i(f)*S_j(f)]E_j(f) + S_i*(f)N(t).$$

The first term in Equations 18 and 19 is the desired seismogram for location i; this can be seen from Equations 3 and 4. The second term is the sum of the cross correlations of the sweeps functions ($[S_i(f)*S_j(f)]$) convolved with the earth responses. The second term will appear as interference noise on the separated record. Note that in this method the extraction of each seismogram is independent of the other seismograms. In contrast, the HFVS method solves for a filter that jointly optimizes the separation for all the seismograms.

In actual field acquisition, the conventional approach to minimize the interference noise shown in Equation 19 is to design sweeps $s_i$ to $S_N$ so they are orthogonal and thus their cross correlation is small. These methods include: using upsweeps and downsweeps (U.S. Pat. No. 4,707,812 to Martinez), using pseudorandom sweeps (see, for example, U.S. Pat. No. 4,168,485 to Payton, et al.), using pseudorandom sweeps with time delays (U.S. Pat. No. 6,704,245 to Becquey), using cascaded sweeps with phase rotations (Moerig et al., International Publication Number WO 02/33442 A2), and using time delays or slip sweeps (see, for example, U.S. Pat. No. 7,050,356 to Jeffryes). Similarly, Ikelle (U.S. Pat. No. 6,327,537) discusses separating or decoding multi-source records for both computer modeling and field acquisition. His methods require either different time delays for each source with the time delays longer than the sweep, or the use of a pseudo-random number (PN) code convolved with each sweep, with the PN codes chosen so that they are mutual orthogonal and that the orthogonality is preserved through the wave propagation. The use of long time delays, longer than a vibroseis sweep, would be equivalent to using multiple sweeps, as defined in the present application, with as many sweeps as there are vibrators. Such long time delays will limit the efficiency gain of using simultaneously operating sources. This method using PN codes, along with the other methods described earlier in this paragraph, rely on cross-correlation (Equation 19) for separating the seismograms.

In practice, however, it is not possible to design sweeps with overlapping frequency bands such that the cross correlations are exactly zero for all the recorded time (that is, they are not perfectly orthogonal, as required by the techniques mentioned in the previous paragraph). Consequently, the separated seismograms obtained from actual field or computer simulated records by using techniques mentioned in the previous paragraph are always corrupted by some amount of interference noise. Even when the sweeps themselves are well-designed, the actual signal imparted into the ground differs from the design sweep in an uncontrolled manner, thereby giving rise to interference noise during separation. To illustrate the interference noise, an earth model with four source locations was convolved with four different pseudo-random sweeps and summed to simulate simultaneous acquisition. The seismograms generated by correlating the data with the four random sweeps are shown in FIGS. 4A-D. The seismograms contain interference noise. As expected, separated seismograms obtained from computer-simulated records would also be corrupted by interference noise.

Various methods have been designed to filter or remove interference noise from separated records obtained from field data. However, all these methods just remove the noise on each individual seismogram and do not move misplaced energy to the appropriate seismogram or optimize the separation. In the slip-sweep method, which uses large time delays between sweeps for different vibrators, interference noise is imprecisely attributed to harmonic noise, which is a type of noise arising from vibrator harmonics. Several methods have been proposed to remove this harmonic noise from separated records using the expected time frequency relationship between the harmonics and fundamental sweep. One approach (Meunier et al., U.S. Pat. No. 6,603,707; Jeffryes, U.S. Pat. No. 6,519,533) uses multiple narrow time-frequency filters to isolate harmonic noise and subtract it from the separated seismograms. Another method (see, for example, Jeffryes, U.S. Patent Publication 2006/0158962 A1) uses correlation of the data with a synthetic sweep containing harmonics and the subtracting the data which correlates with the harmonics. Note that computer-simulated data do not suffer from harmonic noise problems because the sweep signal is exactly known, i.e., the signal driving the vibratory sources is exactly the signal probing the computer model of the earth.

A method called Continuous HFVS ("C-HFVS") disclosed by Krohn and Johnson (PCT Patent Publication WO 2005/019865) overcomes the requirement to have as many sweeps as there are vibrators, but still uses Equation 10 to derive a filter that optimally recovers the individual seismograms. This method was specifically designed for actual field data. In this method for simultaneous use of multiple seismic vibrators, each vibrator uses continuous segmented sweeps. With C-HFVS, one long data record is recorded as shown in FIG. 5. This illustration can be compared to FIGS. 2A-D. In the case of FIG. 5, there are four vibrators, each sweeping a 32-s segmented sweep. The total data record length is 39 s. To simulate multiple sweeps, the total data are parsed by extracting pieces of the data and vibrator segments. The parsing allows a filter to be designed as in Equation 14. The process is illustrated in FIGS. 6A-D. The vibrator signatures are split into four portions (81, 82, 83, and 84) corresponding to the sweep segments and padded with zeros. The field record is also split into four 16-second sections (85, 86, 87, 88) corresponding to the four sections from FIG. 5 (65, 66, 67, 68). It may be noted that pieces of the data are reused. The data segment 91 is the same as segment 86, segment 92 is the same as segment 87, and segment 93 is the same as 88. Compared to HFVS data with four separate sweeps followed by a listening time in which the vibrator motion ceases (FIG. 2, 50), the times 91, 92, and 93 in FIGS. 6A-D are contaminated with the strong events from the next segment. In addition, the start of each segment will contain some data from the previous segment because the deeper reflection's response to the earlier sweep segment will arrive at the same time as the shallow reflection's response to the later sweep segment. After separation (FIGS. 7A-D), interference noise can be observed at the end of the segment length (200) that bleeds upward.

There continues to be a need for a method that satisfactorily separates the responses for two or more geophysical sources operating simultaneously with minimal separation noise corrupting the separated responses when the number of sweeps used are fewer than the number of sources. The present invention addresses this need.

SUMMARY OF THE INVENTION

In one embodiment, the invention is a method for separating multiple-vibrator seismic data with reduced separation-related noise, said seismic data being recorded in a survey with N vibrators operating simultaneously, where the method comprises:

(a) separating the survey data to obtain a preliminary estimate of N seismograms, one per vibrator; and (b) adjusting the seismograms to match the survey data and to satisfy selected characteristics of noise-free seismograms, thereby producing N updated seismograms.

Further steps in some embodiments of the invention include:

(c) testing the updated seismograms to determine a measure of error in fit compared to the survey data and the selected characteristics of noise-free seismograms; and (d) repeating steps (b)-(d) as necessary until the error is less than a pre-selected value or another stopping point is reached.

BRIEF DESCRIPTION OF THE DRAWINGS

The present invention and its advantages will be better understood by referring to the following detailed description and the attached drawings in which:

FIG. 1 is a schematic diagram of a typical land-based acquisition with four vibrators;

FIGS. 2A-D show four typical data records recorded by HFVS acquisition with four vibrators;

FIGS. 15A-D show the four parsed C-HFVS records from FIGS. 6A-D after noise subtraction according to the invention embodiment of FIG. 13;

FIGS. 16A-D show how the results of FIG. 7 for C-HFVS acquisition are improved by the alternative embodiment of the present invention of FIG. 13;

Figures 3A, 3B, 3C, 3D:
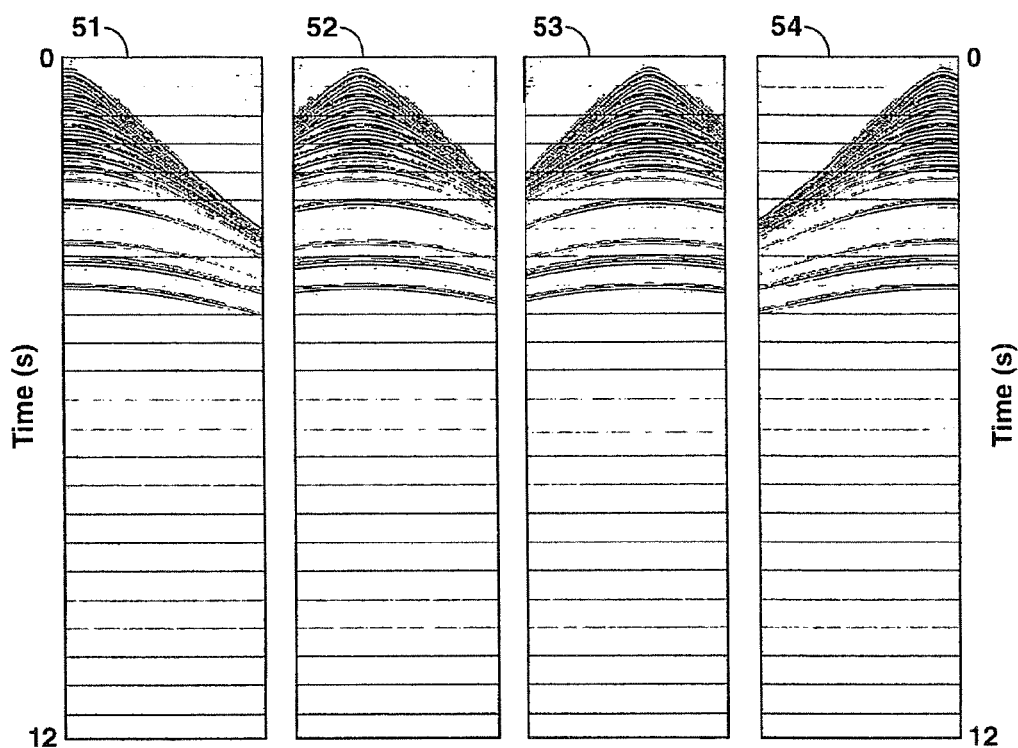
FIGS. 3A-D show four output seismograms recovered with HFVS separation for model data.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention is a computer implemented seismic processing method that improves the recovery of individual seismograms from vibroseis surveys in which multiple vibrators are operated at the same time or from computer model simulations in which the response from multiple sources are simulated at the same time. To enable satisfactory separation of the individual responses, each source must be a vibratory source (in contrast to an impulsive source), and must be operated with a different continuous sweep, i.e. each vibrator must have a unique sweep, and for the purposes of the invention (and to save acquisition time and cost) each sweep is continuous. A continuous sweep for purposes herein means a sweep that preferably (from an acquisition cost standpoint) includes no "listen" time, but at least is not interrupted by any dead time interval longer than the two-way travel time of the seismic wave from the vibrator source to the deepest target and back to a receiver. For longer listen times, the invention would not add any advantage. The present inventive method is also particularly advantageous when the number of sweeps is fewer than the number of vibrators, an efficient operating condition. The individual seismograms can then be separated from such surveys with minimal separation noise.

Conventionally, computer modeling is performed using impulsive or spiked source functions. However, in the case that multiple source locations are simultaneously simulated, then there are advantages to using a sweep source function similar to the vibratory field source. In particular, the techniques discussed in the present invention can be used to improve the separation of the seismograms. As in the field case, the source function for each field location should be a unique continuous sweep. It is possible, with computer simulations to use sweeps that are not physically realizable with mechanical field sources, such as some random sequences with sudden sharp changes in amplitude or polarity. Computer simulations also have the advantage that the source signatures are accurately known.

The present invention's separation method is iterative. The first step (a) is the initial separation and generation of an estimate of the separated seismograms. The initial seismograms are not perfect; they contain interference noise. At least one more additional separation step (b) is then performed in an iterative manner. The subsequent separation step or steps use the raw field records, the preliminary or current estimate of the separated seismograms, and the vibrator sweep signatures to output updated seismograms that contain less noise. Primary criteria for performing the update are the following:

1) The updated seismograms, after convolution with the vibrator sweep signatures and stacking, provide a better fit to the vibroseis records.

2) The updated seismograms better satisfy typical characteristics of ideal, noise-free seismograms. For example, the amplitudes should decay with time, the reflections should be coherent across adjacent seismogram traces, and the reflection times and dips should be constrained by the location of the source.

More iterations can be performed until the updated seismograms satisfy both criteria satisfactorily. Different options exist on how the raw field records, the preliminary seismogram estimates, and the vibrator signatures are used during the seismogram update process. Acquiring data for which the vibratory sources were operated with different continuous sweeps and the iterative separation method disclosed herein must both be employed in tandem to ensure that the individual seismograms can be satisfactorily separated from the recorded survey. The combination of obtaining data that were acquired with different continuous sweeps followed by processing that satisfies the two criteria outlined above are features of the present invention.

Figure 8:
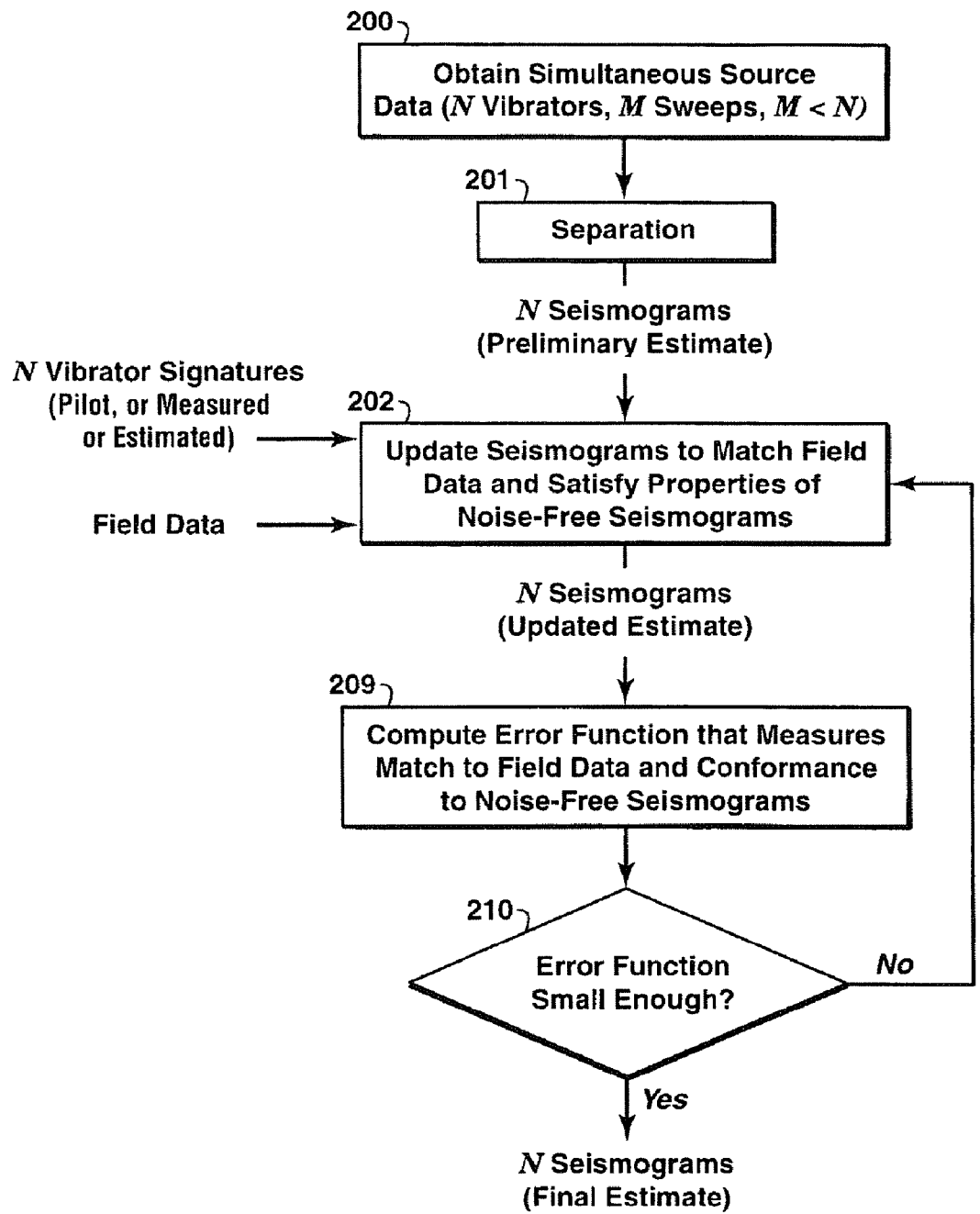
FIG. 8 is a flow chart of basic steps in the broad method of the present invention.

Many different methods can be used to perform the first separation, i.e. step (a) above (step 201 in FIG. 8). For example the correlation type methods cited above: U.S. Pat. No. 4,707,812 to Martinez, U.S. Pat. No. 4,168,485 to Payton, et al, U.S. Pat. No. 6,704,245 to Becquey, International Patent Application Publication Number WO 02/33442 to Moerig et al., U.S. Pat. No. 7,050,356 to Jeffryes, and U.S. Pat. No. 6,327,537 to Ikelle could be used to extract, for one source at a time, a first estimate of the separated seismograms. In addition, the parsing and inversion method described in PCT Patent Application Publication WO 2005/019865 by Krohn and Johnson could also be used. These methods do not include additional separation steps (b), in which the separation is improved and interference noise reduced.

Other methods filter or reduce the noise after the initial separation, but do not include a separate separation step (b). In particular, they work on the separated records one at a time to remove the harmonic-type of interference noise. These methods include those disclosed in U.S. Pat. No. 6,603,707 to Meunier et al., U.S. Pat. No. 6,519,533 to Jeffryes, and U.S. Patent Application Publication 2006/0158962 to Jeffryes.

A method called multi-shooting decoding for both field acquisition and computer simulations is described by Ikelle (U.S. Patent Publication US 2007/0274155. A two stage extraction method is performed by Ikelle in his Algorithm 10, but the processes are performed one shot point at a time. For each source location, the first step is a single correlation, which would generate an estimate of one seismogram. Then Ikelle derives a new updated individual seismogram using filtered versions that contain the stationary and non-stationary components. Ikelle does not utilize the survey data in the updating, nor does he teach updating the seismograms to better match the survey data. Furthermore, each seismogram is extracted sequentially, instead of performing an optimized separation. The extraction is equivalent to reducing some noise for each seismogram but not improving separation by reassigning misplaced energy to the proper source location.

Most of the algorithms discussed by Ikelle in U.S. Patent Publication US 2007/0274155 require impulsive or stationary sources (i.e. the statistical properties do not change with time or position) and he includes a whitening step that explicitly requires that the source signatures or the mixing matrix be time and receiver independent. The present inventive method is not intended for impulse or stationary sources and the source signatures are not time independent; thus, such algorithms of Ikelle do not apply. However, Ikelle's Algorithm 10 is specifically for non-stationary sources. Here, Ikelle operates on each source location in sequence. For each source location, he does a correlation step, then he separates the stationary (i.e. correlated) and non-stationary (i.e. uncorrelated) components of the output records based on anomalies in the amplitude spectra, and then further extracts one record at a time using Independent Component Analysis on the two components. This method can reduce one type of interference noise, the interference noise that remains unstationary after correlation and has anomalies in its amplitude spectrum. It does not appear to address the majority of interference noise that has a similar bandwidth as the reflections or is correlated but at the wrong location in time. In particular, interference noise arising from harmonics in field data is not addressed by Ikelle's method.

Describing the present inventive method now in more detail, the field (understood herein to include simulated) data are first recorded using sweeps that are unique for each vibrator or fleet of vibrators. Unique sweeps must differ from each other in some manner, for example by phase, frequency pattern, time shifts, segmentation, or pseudo-random sequences. (Pseudo-random sweeps are particularly advantageous.) The field records consist of the superposition of data from the multiple vibrators. The field records may have superimposed data for all of the record, such as for pseudorandom sweeps, or for part of the record, such as in slip-sweep data. Preferably, the vibrators sweep simultaneously without time delays. The method allows use of one sweep and the field records as described by Equation 16 and 17. Alternatively, more sweeps can be used. If the number of sweeps is greater than the number of vibrators, then enough information is available to separate the seismograms using the HFVS method. However, if the number of sweeps is less than the number of vibrators, which is an aspect of the technical problem addressed by the present invention, then the seismograms separated with conventional methods suffer from interference noise.

Figures 4A, 4B, 4C, 4D:
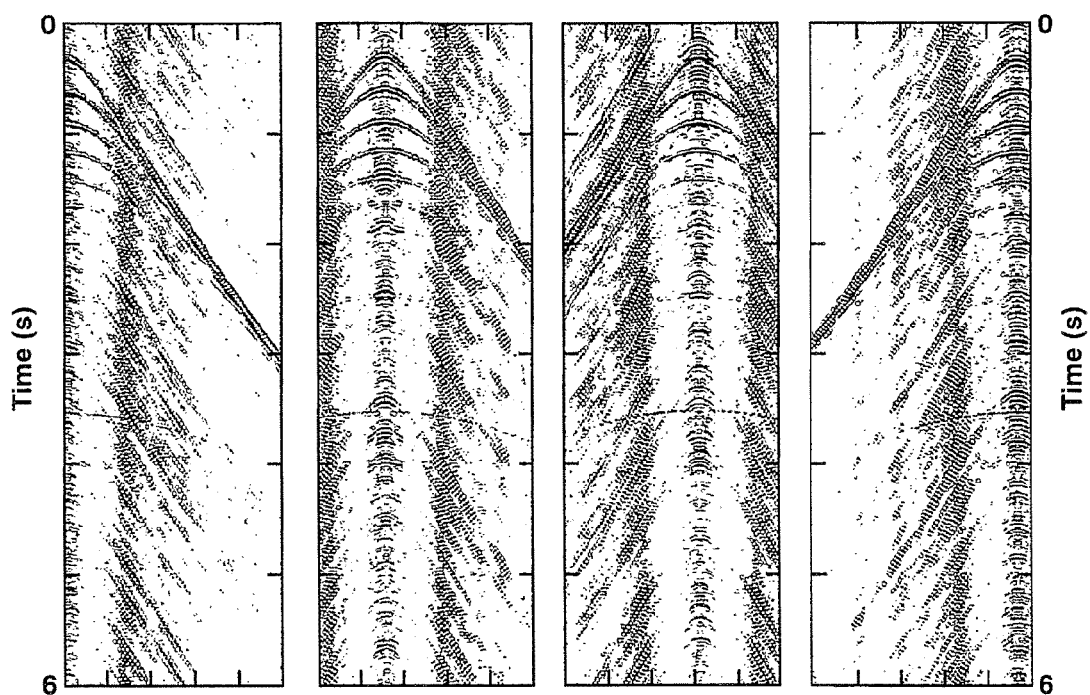
FIGS. 4A-D show four output seismograms generated with pseudorandom sweeps and processed with correlation.
Figure 5:
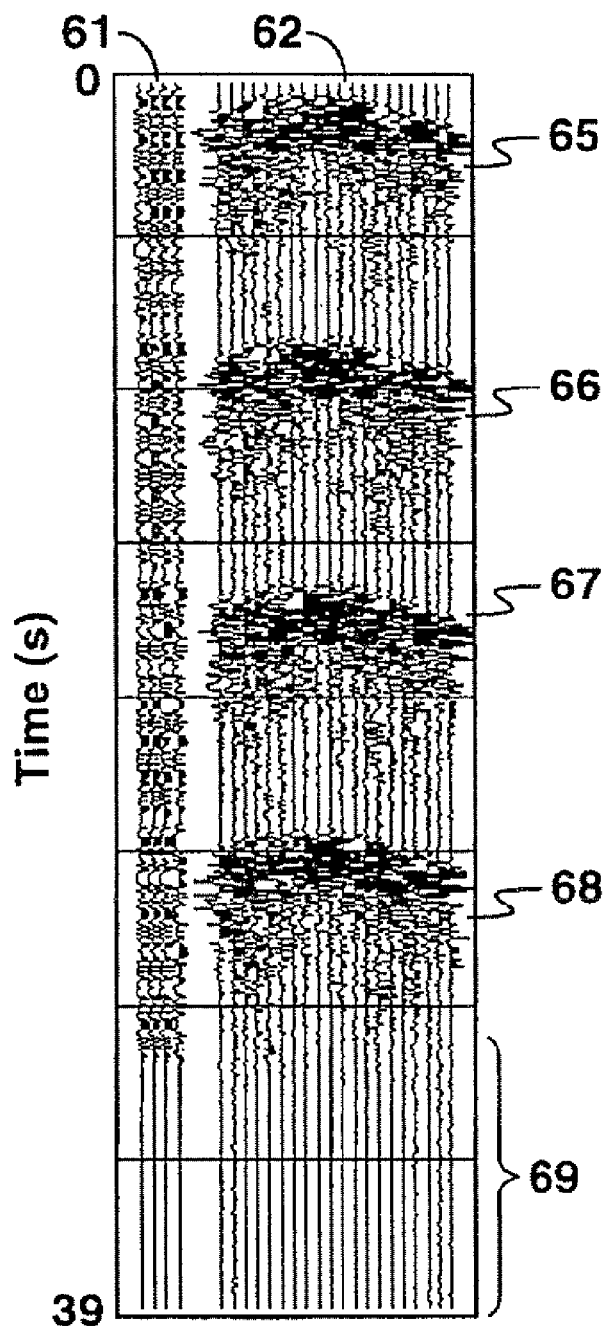
FIG. 5 shows the single data record recorded with C-HFVS acquisition for four vibrators.
Figures 7A, 7B, 7C, 7D:
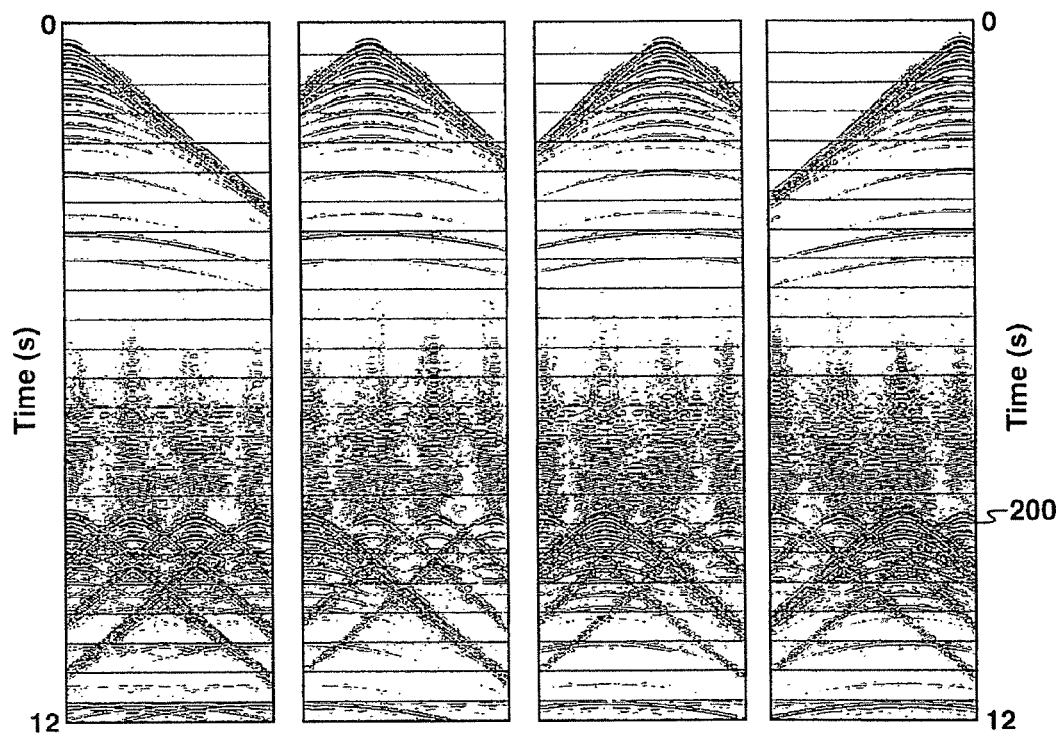
FIGS. 7A-D show four output seismograms generated from HFVS separation of the parsed C-HFVS data from FIGS. 6A-D.

When vibratory sources with unique continuous sweeps are used, the interference noise that corrupts the conventionally separated seismograms can be spread over different times than the signal. In the case of the pseudo-random sweep it can seem random, as illustrated by FIG. 4. In the case of C-HFVS (FIG. 7) it appears near the bottom of the seismograms. However, it is recognized herein that this misplaced or random nature of the interference noise is in fact beneficial and can actually be exploited to obtain satisfactory separation in the case in which the number of sweeps is less than the number of sources and the resulting set of equations are underdetermined. It supplies more information for improved separation. If the vibratory sources use unique continuous sweeps, only the actual desired seismograms will be free of the presence of the random or misplaced energy and he consistent with the field data after convolution with the source signatures. Therefore, when unique continuous sweeps are used, the actual desired seismograms can be estimated with minimal errors by satisfying the two criteria outlined above. The present invention provides an iterative method that performs such improved separation.

Basic steps in one embodiment of the present inventive method are shown in FIG. 8. In accordance with the technical problem being addressed, the input field (or simulated) records to be obtained for the present invention at step 200 are data acquired using N>1 simultaneously operating vibratory sources with M<N different continuous sweeps. The field records are first separated to yield N seismograms by separation step 201. This separation step may be a correlation method, which is typically used for pseudo-random sweeps, or it may be deconvolution with a sweep function, or it may be the C-HFVS inversion method which uses parsing. Alternatively, the cross-correlation separation method presented in this application may be used, or any other separation method not described herein. The resulting N seismograms, $g_1(t)$ to $g_N(t)$, or in the frequency domain, $G_1(f)$ to $G_N(f)$), are the preliminary estimates of the earth response and they would still contain interference noise.

In step 202, the preliminary seismograms from step 201 are updated (adjusted) using the N vibrator signatures (pilot sweeps or measured ground force sweeps or estimated signatures), the field records, and the preliminary seismograms. The update is carried out such that the updated seismograms better exhibit the two criteria enumerated above.

To ensure that criterion 1 is satisfied, step 202 preferably includes convolving the entire preliminary seismogram estimate or extracted parts of the preliminary seismogram estimate with the vibrator signatures corresponding to each vibrator. The result is $$s_i(t) \otimes g'_i(t) \text{ or } S_i(f)G'_i(f) \qquad (20)$$

where g'(t) or G'(f) indicates the modified seismograms. In some embodiments of the invention, one or more error functions, sometimes called cost functions, are designed to measure how well criteria 1 and 2 are satisfied. This is indicated in FIG. 8 as step 209. In such embodiments, the update step implicitly or explicitly optimizes the cost function. The update step 202 may also contain additional intermediate steps such as computing gradients of cost functions, and inverting matrices. Persons skilled in the art will be familiar with such techniques for systematic updating by use of a cost or error function.

In steps 209 and 210, the updated seismograms are tested to determine whether they satisfy the aforementioned criteria 1 and 2 satisfactorily. This test may determine if the updated seismograms explain the field records to within a predetermined noise level. The test may also determine if a predetermined cost function (step 209), which measures the characteristics such as decay of signal strength with time, or correlation between the seismograms recorded at different locations, is sufficiently optimized. In one embodiment of the invention (see penalized least-squares based separation below), a combined measure of error is computed to simultaneously quantify the misfit with respect to both criteria 1 and 2. The test may also or instead comprise a visual inspection of the separated seismograms to ensure that the interference noises are sufficiently attenuated. If the test results are satisfactory, then the updated seismogram would be output as the final estimates. If not, then the updated seismograms are used as input quantities in step 202, and the process repeats until satisfactory results are obtained.

Four different embodiments are disclosed for generating improved seismograms according to the current invention, i.e., for performing step 202. The choice of the appropriate method will vary depending on the type of acquisition and the way in which the different sweeps are designed to differentiate the vibrator source. The four are Signal Extraction, Modeled Noise Extraction, Constrained Optimization-based Separation, and Penalized Least Squares-based Separation. These are examples of different ways to perform step 202. Persons skilled in the art will be able to think of other ways. All such ways are intended to be included in the present invention and the appended claims.

Signal Extraction

Figure 9:
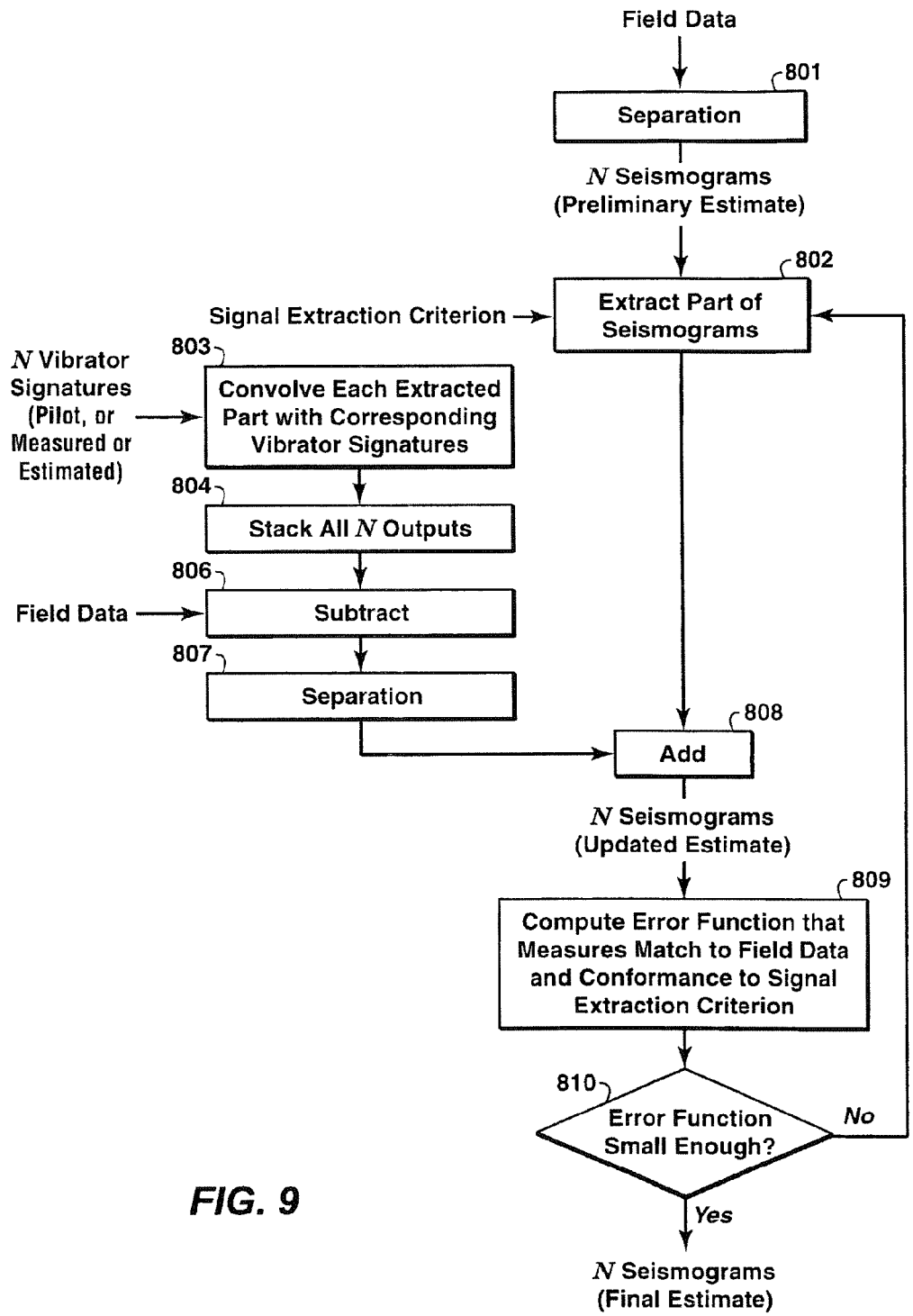
FIG. 9 is a flow chart of one embodiment of the present invention using signal extraction.

The use of signal extraction is the first embodiment that will be discussed, and its main steps are indicated in FIG. 9. FIG. 9 is a more detailed version of FIG. 8, with steps 201, 209 and 210 corresponding to 801, 809 and 810 respectively and the added detail coming in the replacement of step 202. (The input data is, for brevity, referred to simply as field data.) To summarize, the method extracts parts of the preliminary estimate of the separated seismograms that correspond to signal. The extracted signal part is then used to generate a second set of separated seismograms. Options differ for the method of selecting the signal part of the separated data, the method for separation, and the way the field data are updated.

In step 802, the N seismograms are modified by extracting a part of the seismogram that corresponds to signal and saving them. The parts are $g_i^{extract}(t)$ or $G_i^{extract}(f)$. The extraction criterion can be anything that best characterizes the desired seismogram. One possible extraction criterion is to expect earlier arriving reflections to be stronger than later reflections. Since seismic waves spread out spherically away from the source, the returned energy from deeper reflections arriving later in time is always weaker than from shallower reflections which arrive earlier. Noise, however, is less likely to decay with time. In this preferred method, stronger earlier events are extracted from the record and are saved. An alternative criterion is to expect the desired signal component's amplitude and location to vary smoothly across adjacent seismogram traces. Such coherent signal components could be extracted by retaining strong components in a suitable transform domain such as the curvelet domain. (E. J. Candes and D. L. Donoho, "Recovering edges in ill-posed inverse problems: Optimality of curvelet frames," *Annals of Statistics* 30, 784-842 (2002)). These are the first estimate of the earth responses.

In steps, 803 and 804, the extracted parts of the seismograms are converted into a form that can be compared to the recorded field data (termed field form data) by convolution with the vibrator signatures and then stacking the records corresponding to the different vibrators:

$$\sum_{i=1}^{N} s_i(t) \otimes g_i^{extract}(t) \text{ or in the frequency domain,} \quad (21)$$

$$\sum_{i=1}^{N} S_i(f) G_i^{extract}(f)$$

Steps 806 through 807 use the field-form of the extracted data to update the preliminary estimate of the seismogram. In step 806, the field forms of the extracted seismogram components are subtracted from the field data. Other ways of updating such as filtering can be used. The subtraction removes the part of the field data that has already been predicted or extracted. The result is $$d(t) - \sum_{i=1}^{N} s_i(t) \otimes g_i^{extract}(t) \text{ or } D(f) - \sum_{i=1}^{N} S_i(f) G_i^{extract}(f) \quad (22)$$

In step 807, the residuals or updated field records in Equation 22 are separated using one of the separation methods. These steps yield seismogram updates $\Delta g_i(t)$ or $\Delta G_i(f)$, which are added to the previous estimates $g_i^{extract}(t)$ or $G_i^{extract}(f)$ in step 808.

In steps 809 and 810, the N updated seismograms, $g_i^{extract}(t)+\Delta g(t)$ or $G_i^{extract}(f)+\Delta G(f)$, are tested to determine whether or not they are satisfactory. This test may determine whether the updated seismograms explain most of the field data and also satisfy known characteristics of the seismograms such as decaying signal strength with time or poor correlation between the seismograms recorded at different locations. If the test results are satisfactory, then the updated seismograms would be outputted as the final estimates. If not, then the updated seismograms are used in step 802 to extract another part, and the process repeats until satisfactory results are obtained.

The significance of step 802 is that it approximately predicts the portion of the field data that corresponds to the desired signal. By removing these explained portions of the field data, the cross-contamination effects associated with these events are reduced. Step 807 can then extract the weaker reflections in the field data because the interference noise arising from strong signal components are no longer a problem. Consequently, the total updated seismogram output from step 809 contains less inference noise than the preliminary input into step 802. Since the signal extraction part in step 802 is not exact, the steps 802-809 may need to be repeated several times to progressively improve the updated seismograms.

It is possible to design several different embodiments of the iterative signal extraction method described in FIG. 9. First, each complete implementation of the iterative separation could choose a different method for steps 801 and 807, which correspond to obtaining preliminary estimates of the separated seismograms and to obtaining updates from the residual field data, respectively. Second, each implementation could choose a different method to implement step 802, which extracts the signal part from the separated seismograms based on a selected criterion.

Three different separation methods that could be employed in steps 801 or 807 are first described in the paragraphs that follow. Then, three representative signal extraction methods, which could be used to implement step 802, are described. Finally, two complete implementations of the broad iterative separation method of FIG. 9 are given, along with examples of ways to choose a separation method for steps 801 and 807 and a signal extraction method for step 802. All of these alternative methods are intended to be illustrative only and not exhaustive or limiting to the invention.

Selecting Separation Methods: Steps 801 and 807

Three different separation methods are described below. The first method can be used on any type vibroseis field records obtained with multiple vibrators. The second and third methods are specifically designed for vibroseis field records obtained using the C-HFVS acquisition method with segmented sweeps.

Separation Method 1: One-Step Separation by Damped Inversion

To perform the separation, the well-known approach of damped inversion (see, for example, Dianne P. O'Leary, "Near-Optimal Parameters for Tikhonov and other regularization methods," *SIAM Journal of Scientific Computing* 23, 1161-1171 (2001)) is employed to solve the linear problem described by Equation 17. The different seismograms $G_i(f)$ are separated from the field data $D(f)$ by performing the following operation in the frequency domain.

$$\begin{bmatrix} G_1*(f) \\ G_2*(f) \\ \vdots \\ G_N*(f) \end{bmatrix} = \left( \begin{bmatrix} S_1*(f) \\ S_2*(f) \\ \vdots \\ S_N*(f) \end{bmatrix} [S_1(f)\ S_2(f)\ \ldots\ S_N(f)] + \varepsilon R(f) \right)^{-1} \begin{bmatrix} S_1*(f) \\ S_2*(f) \\ \vdots \\ S_N*(f) \end{bmatrix} D(f) \quad (23)$$

In the above equation, E can be chosen to be any non-negative number that is constant for all frequencies and $R(f)$ is non-negative function of the frequencies. Typically, the choice of s and $R(f)$ are dictated by the noise level corrupting the vibroseis data and the bandwidth of the sweep signal. In Equation (23) all sweeps are jointly inverted. In contrast, a simpler approach is to invert each sweep independently as follows.

$$\begin{bmatrix} G_1*(f) \\ G_2*(f) \\ \vdots \\ G_N*(f) \end{bmatrix} =$$

$$\begin{pmatrix} (|S_1(f)|^2 + \varepsilon_1 R_1(f))^{-1} & 0 & 0 & 0 \\ 0 & (|S_2(f)|^2 + \varepsilon_2 R_2(f))^{-1} & 0 & 0 \\ 0 & 0 & \ddots & 0 \\ 0 & 0 & 0 & (|S_N(f)|^2 + \varepsilon_N R_N(f))^{-1} \end{pmatrix} \begin{bmatrix} S_1*(f) \\ S_2*(f) \\ \vdots \\ S_N*(f) \end{bmatrix}$$

$$D(f)$$

Separation Method 2: One-Step Separation by HFVS-Like Inversion

Figures 6A, 6B, 6C, 6D:
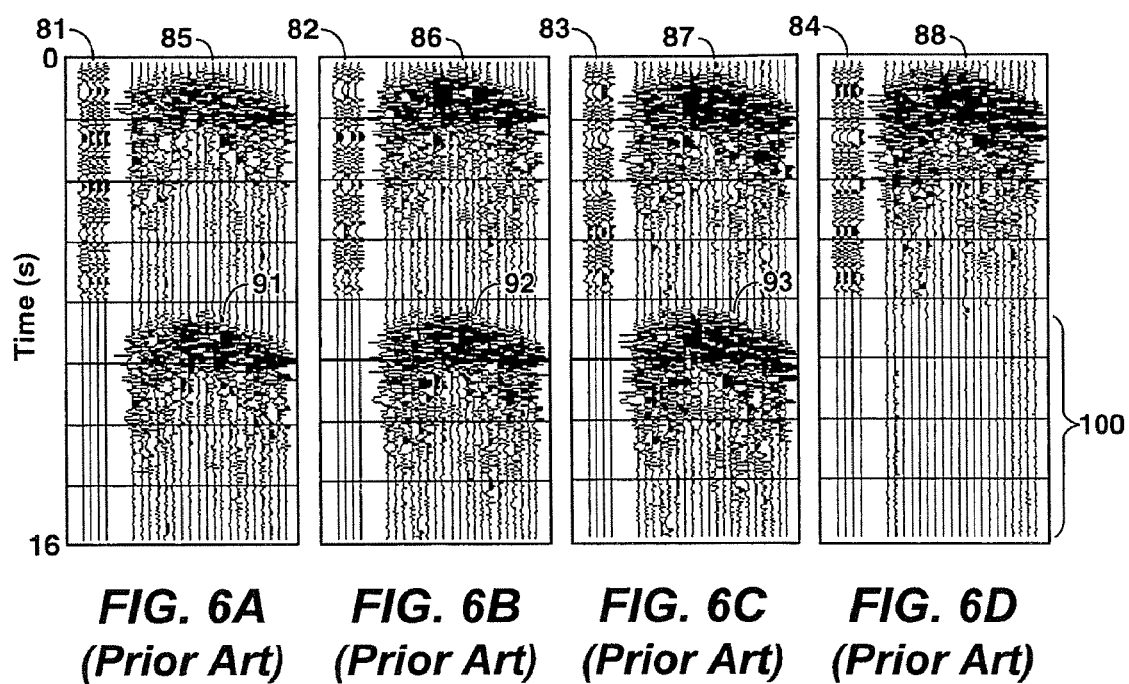
FIGS. 6A-D show four parsed records extracted from the single C-HFVS data record of FIG. 5.

As described earlier in this document, the Continuous HFVS method ("C-HFVS") records vibroseis data when multiple vibrators impart continuous segmented sweeps into the ground. To separate the seismograms from the recorded vibroseis data, the recorded data and the vibrator sweeps are first parsed to set up a linear equation that resembles Equation 10. The linear equation is solved as described in Equation 14 to obtain the separated seismograms. The process is illustrated in FIG. 6.

Separation Method 3: One-Step Separation by Cross-Correlation Method

The separation method described next is believed to be new and is particularly designed to separate field records recorded by the C-HFVS method or with segmented sweeps. The existing separation technique for C-HFVS is described in PCT Patent Publication WO 2005/019865, and it suffers from increased levels of interference noise because in the parsed data, some parts such as the parts of the data within the listening times 91, 92 and 93 are corrupted by the strong early reflectors convolved with the second sweep segment. To reduce this interference noise, the following separation method is disclosed, based on the insight that cross-correlations partially "roll back" an impulse response to zero lag. The steps in the extraction are outlined below. The method is summarized by FIG. 10. The cross-correlation operation is well known to practitioners in the vibratory seismic field; see, for example, Sheriff, page 69.

In step 850, the field record d(t) from operating N vibrators simultaneously is cross-correlated with each of the N sweeps $s_i(t)$ to obtain N cross-correlated field records. These N cross-correlated field records can be mathematically expressed as:

$$\begin{bmatrix} s_1(-t) \otimes d(t) \\ s_2(-t) \otimes d(t) \\ \vdots \\ s_N(-t) \otimes d(t) \end{bmatrix}. \quad (24)$$

Figure 10:
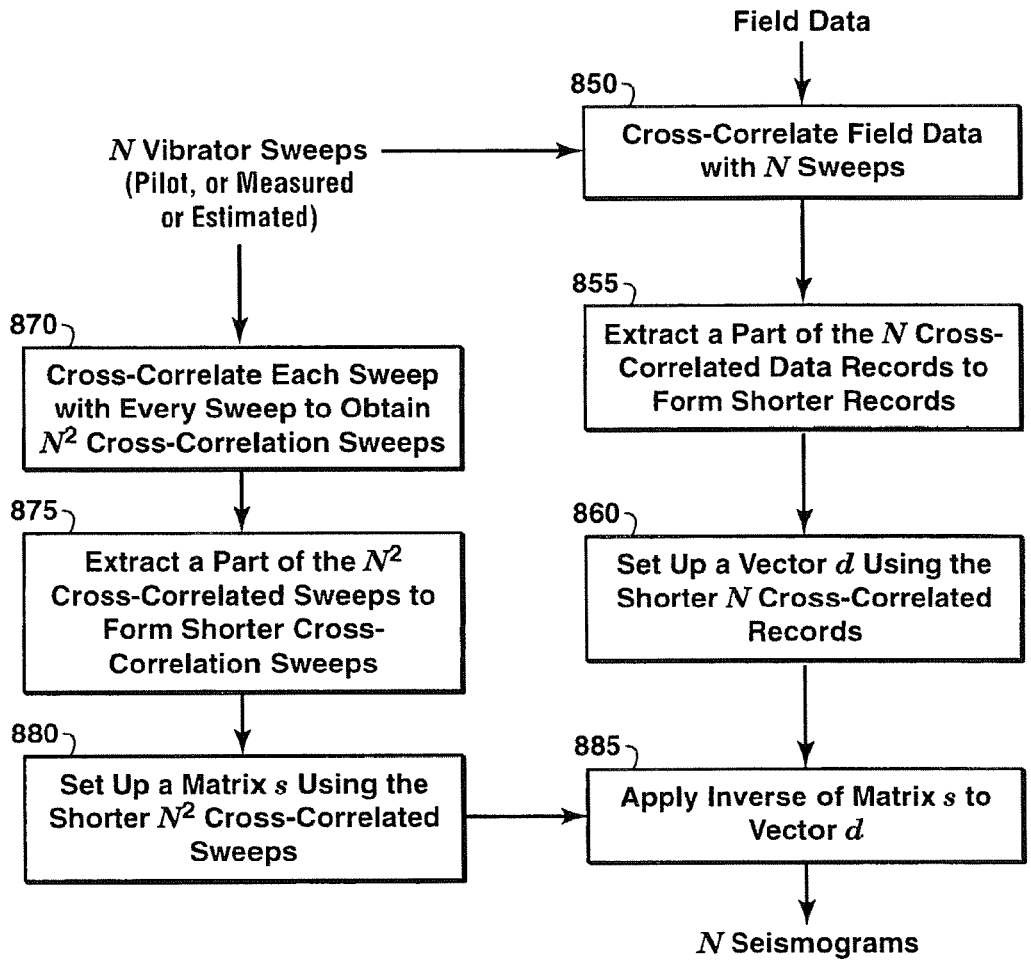
FIG. 10 is a flow chart of one method of separation using cross correlations.
Figures 11A, 11B, 11C, 11D:
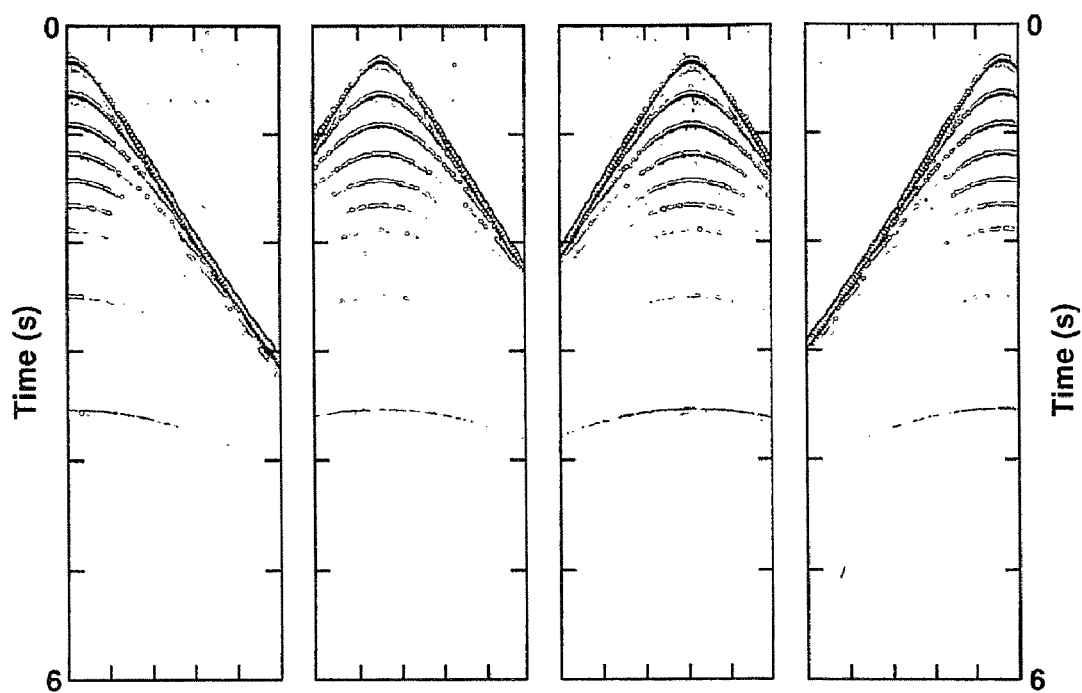
FIGS. 11A-D show the results of FIGS. 4A-D for pseudorandom sweeps improved by the use of the present inventive method.
Figures 12A, 12B, 12C, 12D:
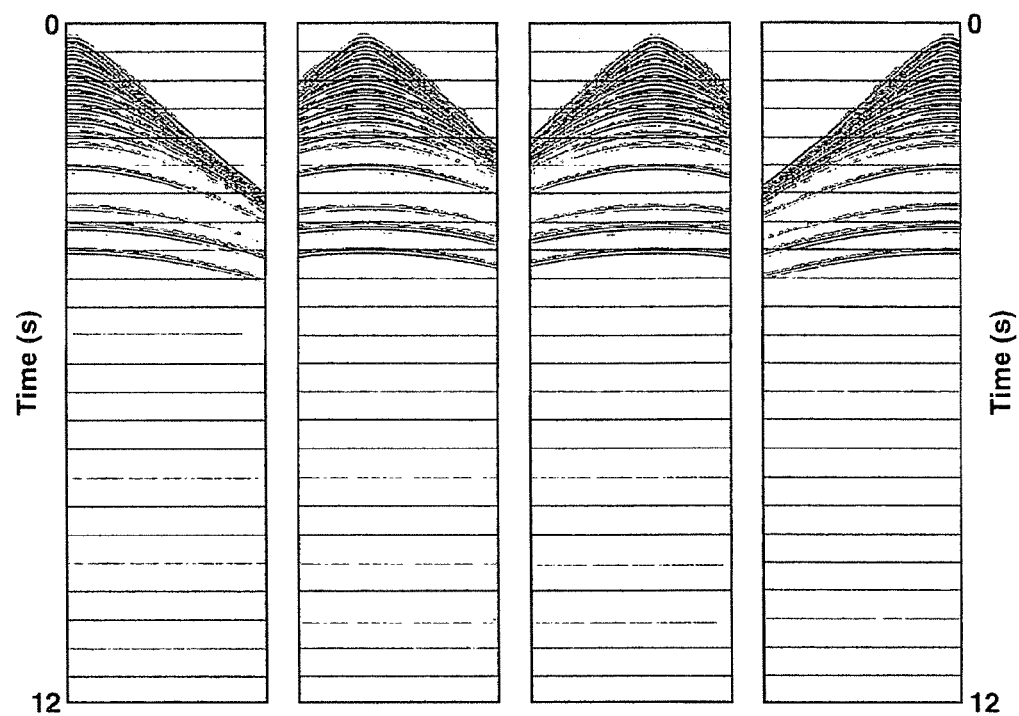
FIGS. 12A-D show the results of FIGS. 7A-D for C-HFVS acquisition improved by one embodiment of the present inventive method.

In step 870 of FIG. 10, cross-correlate each sweep $s_i(t)$ with all sweeps (including itself) to obtain $N^2$ cross-correlation sweeps. Mathematically, this can be expressed as $$\left( \begin{bmatrix} s_1(-t) \\ s_2(-t) \\ \vdots \\ s_N(-t) \end{bmatrix} \otimes [s_1(t) \; s_2(t) \; \ldots \; s_N(t)] \right). \quad (25)$$

Note that Equation 24 and Equation 25 can be related to each other using Equation 16 as follows:

$$\begin{bmatrix} s_1(-t) \otimes d(t) \\ s_2(-t) \otimes d(t) \\ \vdots \\ s_N(-t) \otimes d(t) \end{bmatrix} = \quad (26)$$

$$\left( \begin{bmatrix} s_1(-t) \\ s_2(-t) \\ \vdots \\ s_N(-t) \end{bmatrix} \otimes [s_1(t) \; s_2(t) \; \ldots \; s_N(t)] \right) \otimes \begin{bmatrix} e_1(t) \\ e_2(t) \\ \vdots \\ e_N(t) \end{bmatrix} + \begin{bmatrix} s_1(-t) \\ s_2(-t) \\ \vdots \\ s_N(-t) \end{bmatrix} \otimes n(t).$$

In step 855, extract and retain a part of the N cross-correlated records from step 850, the extracted part corresponding to $-T_1 < t < T_2$, where $T_1$ and $T_2 > 0$, with $T_2 + T_1$ preferably greater than length of each segment in the C-HFVS sweeps. Mathematically, this can be expressed as the following vector (step 860):

$$\begin{bmatrix} s_1(-t) \otimes d(t) \\ s_2(-t) \otimes d(t) \\ \vdots \\ s_N(-t) \otimes d(t) \end{bmatrix}_{-T_1 < t < T_2} \quad (27)$$

In step 875, extract and retain a part of the $N^2$ cross-correlated sweeps from step 870 corresponding to $-T_3 < t < T_3$, where $T_3 > 0$, with $2T_3$ preferably less than the length of each segment in the C-HFVS sweeps. Mathematically, this can be expressed (step 880) as the matrix $$\left( \begin{bmatrix} s_1(-t) \\ s_2(-t) \\ \vdots \\ s_N(-t) \end{bmatrix} \otimes [s_1(t) \; s_2(t) \; \ldots \; s_N(t)] \right)_{-T_3 < t < T_3} \quad (28)$$

In step 885, apply the inverse of the matrix constructed in step 880 to the vector of cross-correlated records from step 860:

$$\begin{bmatrix} g_1(t) \\ g_2(t) \\ \vdots \\ g_N(t) \end{bmatrix} \approx \left( \left( \begin{bmatrix} s_1(-t) \\ s_2(-t) \\ \vdots \\ s_N(-t) \end{bmatrix} \otimes [s_1(t) \; s_2(t) \; \ldots \; s_N(t)] \right)_{-T_3 < t < T_3} + \varepsilon I \right)^{-1} \otimes \begin{bmatrix} s_1(-t) \otimes d(t) \\ s_2(-t) \otimes d(t) \\ \vdots \\ s_N(-t) \otimes d(t) \end{bmatrix}_{-T_1 < t < T_2} \quad (29)$$

where $\varepsilon$ can be chosen to be any non negative number. To perform the matrix inversion, the cross-correlated field records from step 875 are transformed to the frequency domain, and the inversion i, performed, frequency by frequency.

The above method separates the seismograms particularly well for times $0 < t < T_2 - T_3$ when the signal at times greater than the time duration of an individual segment of the C-HFVS sweep (termed sweep segment henceforth) is small compared to the seismogram signal at early times. The interference noise levels in the seismogram increase gradually at later times from $T_2 - T_3 < t < T_2$. In a preferable embodiment of the invention, one chooses $T_2$ to be equal to slightly less than the time duration of a C-HFVS sweep segment, and $T_1$ and $T_3$ to be equal to half the time duration of a C-HFVS sweep segment. For such a choice, the above method separates the seismogram from times $t > 0$ up to t equal to half the time duration of a C-HFVS sweep segment.

Choices for Step 802: Signal Extraction Methods

There are a number of different methods that can be employed in step 802 of FIG. 9 to extract parts of the seismogram. These methods are based on the typical characteristics of noise-free seismograms. For example, it is well known that the amplitude of seismic events observed in a seismogram decay with increasing time. In addition, seismic reflectors that appear in a group of adjacent seismogram traces are coherent. Here coherence means in general terms that the amplitude and times of the reflectors vary smoothly across adjacent traces. Further, the separated seismograms should not contain signal clearly related to sources at the locations of the other vibrators by time of arrivals or dips. In contrast to the desired signal, the amplitude of interference noise that arises during conventional separation methods does not decay with time. Characteristics such as the aforementioned can be exploited to perform signal extraction on a trace-by-trace basis in the time domain, on a trace-by-trace basis after transforming each trace, or collectively on a group of traces that is transformed to some different domain. The signal extraction can also be guided by first constructing a template for noise-free seismograms using prior information or efficient computational techniques as described below.

Signal Extraction Method 1: Time Domain Trace-by-Trace Signal Extraction

In this method, each trace from the preliminary seismogram estimate $G_i$ is converted to the time domain. Then, one obtains $g_i^{extract}(t)$ as $g_i^{extract}(t) = \mu(t) g_i(t)$, where $\mu(t)$ is a function that takes values between 0 and 1 (both inclusive). Typically, the $\mu(t)$ is chosen such that $\mu(t)$ is large for earlier times and small for later times. Such a choice ensures that the strong early components of $G_i$ are extracted, whereas the strong components arriving later in time are muted. Preferably, the $\mu(t)$ is adjusted during each iteration. The $\mu(t)$ could also be adapted for each seismogram; that is, a different $\mu_i(t)$ can be used for each $g_i(t)$. For example, $\mu(t)$ could be adjusted so that the extracted signal component's so-called $L_p$ norm satisfies the following constraint $$\sum_t \sum_i w(t) |\mu(t) g_i(t)|^p < \lambda_2,$$

where p is a user-defined value between 1 and 2 (both inclusive), and w(t) is a user-defined weighting function (for example, $w(t) = t^\eta$ for some $\eta > 0$), and $\lambda_2$ is a user-defined non-negative number. For example, when p=1, then $g_i^{extract}$ is obtained by a performing a so-called soft-thresholding (See, for example, Mallat, *A Wavelet Tour of Signal Processing*, Academic Press, (1998), 441-446)) operation on g; with appropriate thresholds.

Signal Extraction Method 2: Trace-by-Trace Transform Domain Signal Extraction

In this method, each trace is converted from the preliminary seismogram estimate $g_i$ to another domain such as the wavelet transform domain (see, for example, Mallat, supra, 220-310) or the normal moveout correction domain (see, for example, Sheriff, page 247). Then, one shrinks the amplitude of each transform domain coefficient of $g_i$. For example, soft thresholding with time-varying thresholds can be employed. Preferably, the transform domain coefficients corresponding to the seismogram signal from early times are shrunk less compared to the coefficients corresponding to later times. Then, an inverse transformation of the shrunk coefficients is performed to obtain $g_i^{etract}(t)$.

Signal Extraction Method 3: Transform Domain Signal Extraction from a Group of Traces In this method, a collection of traces from the preliminary seismogram estimate $g_i$ is converted to another domain such as the curvelet transform domain (E. J. Candes and D. L. Donoho, 2002, "Recovering edges in ill-posed inverse problems: Optimality of curvelet frames," Annals of Statistics 30, 784-842 (2002)), the frequency-wavenumber domain, the radon transform domain, or other transform domains known to persons skilled in the art. The collection of traces would preferably have some field acquisition geometry in common such as common midpoint, common offset, common receivers, etc. The collection of traces can be arranged to form a two-dimensional image, or higher dimensional volume. After transforming the collection of traces, the amplitude of the transform domain coefficients is reduced appropriately. Preferably, the coefficients corresponding to the seismogram signal from early times are shrunk less compared to the coefficients corresponding to later times. Preferably, the shrinkage factor employed during each iteration is changed so the $L_p$ norm of the coefficients in the transform domain satisfies some mathematical constraint. Then, an inverse transformation of the shrunk coefficients is performed to obtain $g_i^{extract}(t)$.

Signal Extraction Method 4: Signal Extraction Using Simulated Templates

Instead of using signal extraction methods 1, 2, or 3, signal extraction could also be performed by employing weighted or adaptive subtraction of noise-free templates from the preliminary seismogram estimate. A template is constructed using the properties of noise-free seismograms. The techniques disclosed in U.S. Provisional Patent Application No. 60/999,286 may be used for such purposes. Details about how to use the templates to perform signal extraction are described next.

A noise-free seismogram template can be constructed by using prior knowledge about the survey area in conjunction with the physics of seismic wave propagation. For example, in seismic field acquisition, a rough estimate of the wave propagation velocities are often known in advance (inferred from previous low resolution surveys, or from existing data). Such velocities can be used by ray tracing algorithms to construct a useful template for the noise-free seismograms. Instead of ray tracing algorithms, finite difference modeling and other equivalent alternatives can also be used to simulate templates for noise-free seismograms. In some cases, prior surveys may provide low resolution estimates of individual noise-free seismograms.

During computer modeling of field records, all the modeling parameters are known in advance. Typically, detailed modeling using all the parameters is computationally demanding. In such a case, a cheaper modeling method could be employed to construct the noise-free seismogram templates. These templates could then be used to perform signal extraction that arises during separation of the seismograms in the detailed modeling. For example, modeling the elastic response of the earth is extremely expensive. However, most of the signal components in the true elastic response can be cheaply constructed by using acoustic modeling or ray tracing.

The noise-free seismogram templates constructed using the above methods or other well-known methods can be used to fine tune the signal extraction methods 1, 2, and 3 described above. For example, the templates can be used to design accurate estimates of $\mu(t)$ and $w(t)$ in the signal extraction method 1. In signal extraction methods 2 and 3, the templates can be used to choose the shrinkage parameters in the chosen transform domain. For example, the corresponding collection of template traces could be transformed into the curvelet transform domain (or other such domains) and the coefficient magnitudes of this transformed template could be used set the shrinkage parameters.

Examples of the Present Inventive Method Using Signal Extraction

Next, a description is given of two complete implementations of the method of FIG. 9 where the damped inversion separation method is combined with the time domain signal extraction method, both described above. The parameters for the damped inversion and the signal extraction are varied during each iteration to ensure that after sufficient iterations, the separated seismograms not only match the field data, but also enjoy the desirable characteristics of noise-free seismograms. The first implementation is particularly well-suited to separate pseudorandom sweep data, such as that illustrated in FIG. 4. The improved separated seismograms, which are obtained using this implementation, are illustrated in FIGS. 11A-D.

Damped Least-Squares Inversion-Based Separation Details

To perform the separation in step 801, this implementation employs the damped least-squares inversion described by Equation 23. The parameters $\epsilon$ and $R(f)$ during the separation are chosen such that the separated seismograms $G_i(f)$ match the field data $D(f)$ in the weighted least-squares sense. Mathematically, the separated seismograms satisfy the following constraint.

$$\sum_f R(f) \left| [S_1(f) \ S_2(f) \ \ldots \ S_N(f)] \begin{bmatrix} G_1*(f) \\ G_2*(f) \\ \vdots \\ G_N*(f) \end{bmatrix} - D(f) \right|^2 < \lambda_1 \quad (30)$$

Above, $R(f)$ is a user-defined non-negative weighting function that controls the relative importance of matching the field data at different frequencies $f$. The $\lambda_1$ is a user-defined non-negative number that quantifies the amount by which the separated seismograms need to match the field data.

To perform the separation in step 807, an operator identical to the one described in Equation 23 is employed on the residual data $$D(f) - \sum_{j=1}^{N} S_i(f) G_i^{extract}(f)$$

to obtain the different seismogram updates $\Delta G_i$.

$$\begin{bmatrix} \Delta G_1*(f) \\ \Delta G_2*(f) \\ \vdots \\ \Delta G_N*(f) \end{bmatrix} = \quad (31)$$

$$\left( \begin{bmatrix} S_1*(f) \\ S_2*(f) \\ \vdots \\ S_N*(f) \end{bmatrix} [S_1(f) \ S_2(f) \ \ldots \ S_N(f)] + \varepsilon R(f) \right)^{-1} \begin{bmatrix} S_1*(f) \\ S_2*(f) \\ \vdots \\ S_N*(f) \end{bmatrix} \times \left( D(f) - \sum_{j=1}^{N} S_i(f) G_i^{extract}(f) \right)$$

The parameters $\epsilon$ and $R(f)$ during the separation in step 807 are chosen such that the updated seismograms $G_i^{extract}(f) + \Delta G_i(f)$ match the field data $D(f)$ in the weighted least-squares sense $$\sum_f W(f) \left| [S_1(f) \ S_2(f) \ \ldots \ S_N(f)] \begin{bmatrix} \Delta G_1^{extract}*(f) + \Delta G_1(f) \\ \Delta G_2^{extract}*(f) + \Delta G_2(f) \\ \vdots \\ \Delta G_N^{extract}*(f) + \Delta G_N(f) \end{bmatrix} - D(f) \right|^2 < \lambda_1. \quad (32)$$

In this sample implementation the choice of E in particular changes during each iteration.

Time-Domain Signal Extraction Details

The signal extraction in step 802 is performed by employing soft thresholding, with temporally varying thresholds, on the separated seismograms. The thresholds are chosen to ensure that the extracted seismogram signal not only satisfies the spherical spreading characteristic, but exhibits sparse reflectivity. Mathematically, the extracted seismograms are thresholded such that the $L_1$ norm of the extracted signal after time-gaining (by multiplying the trace with a time dependent amplitude term) is smaller than a user-defined value.

$$\sum_{t}\sum_{j=1}^{N}|t^{\alpha}g_{j}^{extract}(t)|<\lambda_{2}. \quad (33)$$

Above, $t^{\alpha}$ is a commonly employed time-gain process, with $\alpha>0$ denoting the gain exponent. The constraint $\lambda_{2}>0$ is a user-defined parameter that controls the sparseness of the seismograms. The $\alpha$ is typically chosen between 0.5 and 2 to compensate for spherical spreading. At any iteration, given the updated seismograms $g_j(t)$, the signal part $g_j^{extract}(t)$ that satisfy Equation 33 can be expressed as $$g_j^{extract}(t) = \begin{cases} g_j(t)-\beta t^{\alpha}, & \text{if } g_j(t) > \beta t^{\alpha}, \\ g_j(t)+\beta t^{\alpha}, & \text{if } g_j(t) < -\beta t^{\alpha}, \\ 0, & \text{if}|g_j(t)| < \beta t^{\alpha}. \end{cases} \quad (34)$$

The threshold parameter $\beta$ is in Equation 34 is chosen such that Equation 33 is satisfied. In this sample implementation the choice of/changes with iterations (it typically tends towards 0 with increasing iterations).

Checking the Quality of the Updated Estimate

The updated seismograms may be deemed to be acceptable if they simultaneously satisfy Equation 30 and the following equation:

$$\sum_{t}\sum_{j=1}^{N}|t^{\alpha}g_{j}(t)|<\lambda_{2}. \quad (35)$$

Alternative Implementation

The above implementation can be performed for C-HFVS data as well. In this example application, the separation step 807 in FIG. 9 is preferably replaced by the cross-correlation method in FIG. 10. The signal extraction method does not change. Improved seismograms are shown in FIGS. 12A-D.

Modeled Noise Extraction

Figure 13:
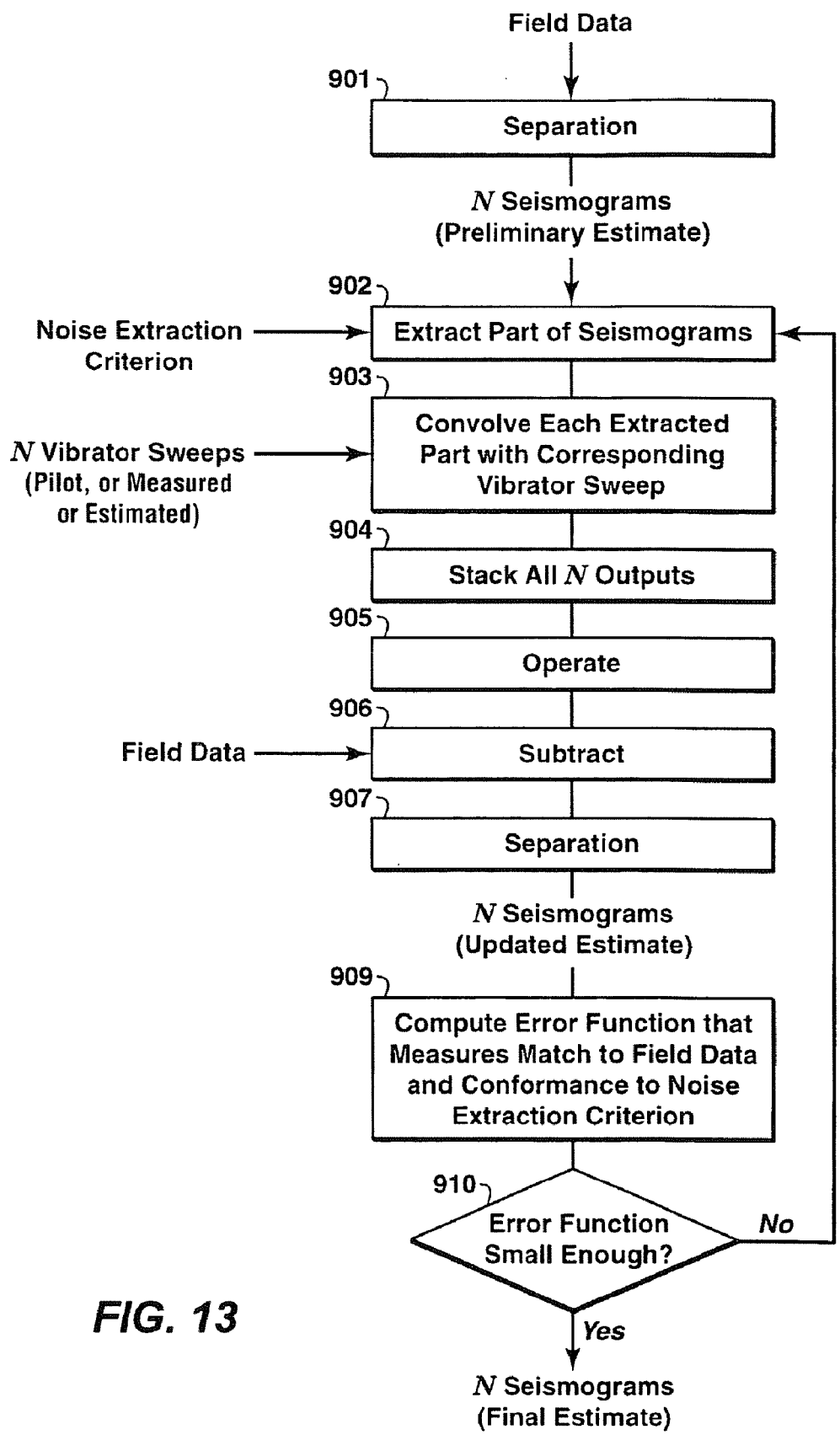
FIG. 13 is a flow chart of basic steps in an alternative embodiment of the present invention using modeled noise extraction.

A second way of performing step 202 of FIG. 8 is described in FIG. 13. Steps 901, 909 and 910 correspond to steps 201, 209 and 210 in the flow chart of the general method, FIG. 8. Steps 902-907 indicate how step 202 in the general flow chart may be performed in this embodiment of the invention. Here, parts of the seismograms including some signal and some noise are extracted in step 902 using a criterion based on how noise is typically manifested in the field records. For example, large amplitudes at later times are likely to be noise. Other examples include events with unexpected dips or the relationship between frequency and time. The field-form noise is then modeled in steps 903-905 by convolving the extracted part of each seismogram with the respective vibrator sweep signature, stacking all the convolved noises, and performing an operation such as a time shift or filter. The modeled noise is subtracted from the field record in step 906. The noise-reduced record is then used to obtain improved separation of the seismograms (step 906). In this method, one iteration is likely to be sufficient, but it can be repeated as many times as deemed necessary.

Figure 14A:
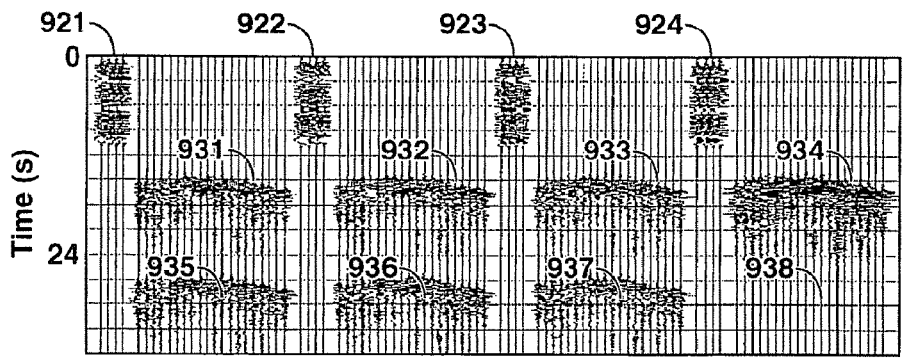
FIGS. 14A-D show results of an example application of the alternative embodiment of FIG. 13 using modeled noise extraction.
Figure 14B:
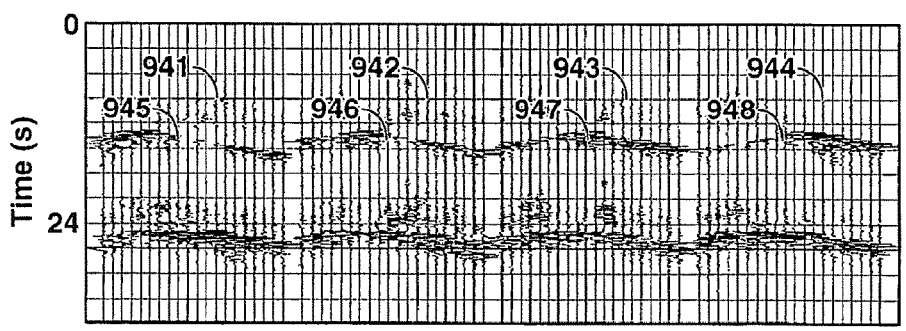

The modeled noise extraction method (FIG. 13) may be further illustrated in reference to the C-HFVS data in FIGS. 6A-D and demonstrated in FIGS. 14A-D. The steps for C-HFVS style data recorded with segmented sweeps are given in more detail for one embodiment of the invention as follows:

1) In step 901 of FIG. 13, the field records are first parsed into the M sweep segments and then separated using the C-HFVS separation method to obtain the N preliminary seismograms (FIG. 14B). In this example, the number of sweep segments M is 4 and the number of vibrators and preliminary seismograms N is also 4. During this step, the field records can optionally be shifted in time as shown in FIG. 14A. In this figure, the parsed data records 931-934 have been shifted to a later time relative to the vibrator signatures 921-924. The time shift is useful to retain noises (941-944) before the strong first arrivals (945-948).

Figure 14C:
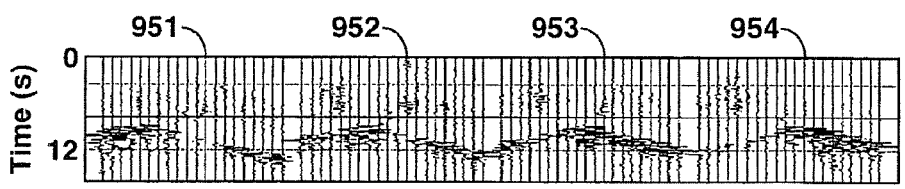
Figure 14D:
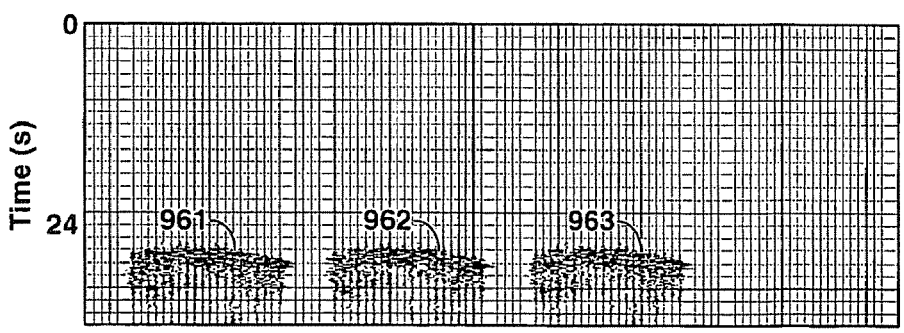

2) In step 902, parts of the resulting seismograms are extracted using a noise extraction criterion. In the example in FIG. 14A, high amplitude events later in time (935-937) are recognized as noise composed of reflections convolved with the following sweep segment in the parsed data. Therefore, the part of the seismogram between 4 and 12 seconds, corresponding to reflected signal and the associated noise, is accordingly extracted as shown in 951-954 (FIG. 14C). This extraction can be performed using a mute.

3) In step 903, the N (in this case 4) extracted parts are then convolved with N vibrator sweep signatures for each of the M−1 sweep segments (922, 923, and 924). The signatures from the first sweep segment (921) are not used because there is no data before the first sweep segment. The signature for the first vibrator is convolved with the seismogram for the first vibrator location 951, the signature for the second vibrator is convolved with the seismogram for the second vibrator location 952, and similarly for the third, 953 and fourth vibrators 954. Then similar operations are performed for the second 923 and third 924 sweep segments. Finally, an optional mute can be used above the strong reflectors to further restrict the noise estimate and protect possible signal.

4) In step 904, for each of the M−1 sweep segments, the N records corresponding to the different vibrators are stacked or summed.

5) In step 905, an operation is applied to the M−1 extracted parts now in field form (as in Equation 20). In this example, they (961-963) are shifted by the length of the sweep segment so that they are aligned with the noise in the parsed data (FIG. 14 A).

6) After the noise is modeled and aligned, it is subtracted from the corresponding field data (step 906). The subtraction removes contaminated noise from the listening time (FIG. 14A: 935-937) but not from the primary sweep time (931-934). The convolved and summed data from the second sweep segment (961) is subtracted from the first parsed record, 935. The convolved and summed data from the third sweep segment (962) is subtracted from the second parsed record, 936, and so forth. Partially processed results are shown in FIGS. 15A-D where it can be seen that during the listening time 1400 some of the contamination noise in the listening time 100 in FIGS. 6A-D (particularly 91, 92, and 93) has been removed (compare 71, 72, and 73).

7) Repeat the separation (step 907). Results are demonstrated in FIGS. 16A-D.

8) Repeat the procedure if desired (steps 909 and 910).

For non-C-HFVS data, the following detailed steps may be used:

1) The field records are first separated (step 901) using correlation or another appropriate method to produce N seismograms. This separation may include a time shift.

2) Then an operation is done to extract part of the seismograms (step 902). This may include muting part of the trace or filtering or using time-varying frequency filters. The extraction is based on a model of where the interference noise is manifested in the field records.
3) The N extracted parts are then convolved with N vibrator sweeps or with some signal generated from the signatures such as the harmonics of the sweep (step 903). These sweeps preferably include the difference between the vibrators including any delay times or slip times.
4) The N convolved records from the different vibrators are stacked or summed in step 904.
5) In step 905, an operation is performed according to the noise model to generate an estimate of the noise. This may include time shifts, mutes, or filters. Alternatively, this step can occur before the stack. The result should represent the part of the field data that causes noise.
6) The convolved noise estimate is then subtracted from the corresponding field data in step 906.
7) Repeat the separation (step 907)
8) Repeat the procedure if desired (steps 909, 910)

In summary, FIGS. 16A-D show four output seismograms generated from separation of the parsed C-HFVS data of FIGS. 14A-D, showing the benefit of applying the modeled noise extraction embodiment of the present inventive method for a segmented sweep and C-HFVS data.

Constrained Optimization-Based Separation

Figure 17:
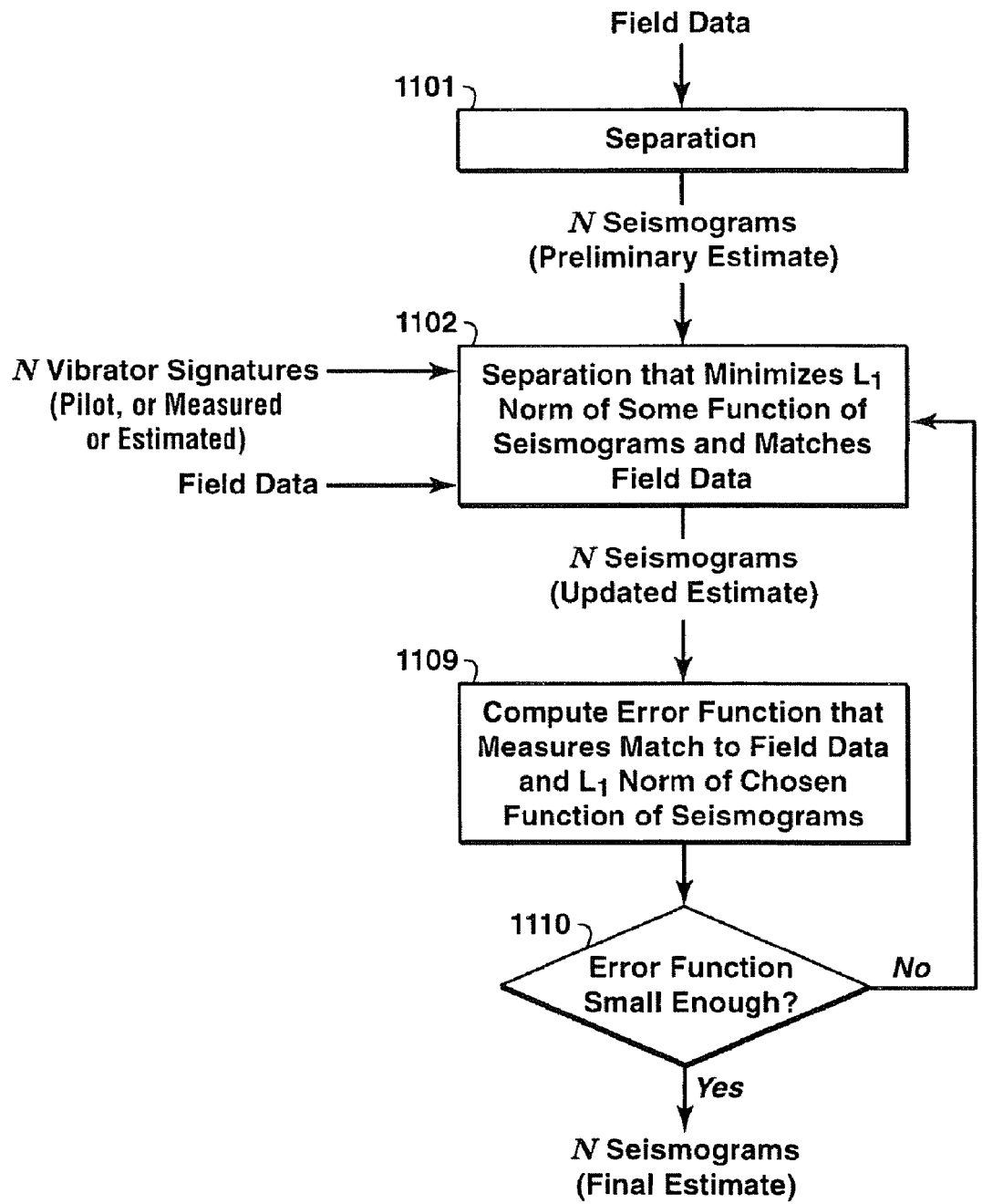
FIG. 17 is a flow chart of basic steps in an alternative embodiment of the present invention that employs optimization methods.

A third way of performing step 202 of FIG. 8 is described in FIG. 17. More precisely, one embodiment of the third way is shown; e.g. a norm other than the $L_1$ norm could be selected and used. Again, steps 1101, 1109 and 1110 correspond to steps 201, 209 and 210 in the flow chart of the general method, FIG. 8. Step 1102 indicates in a general way how step 202 may be performed in this embodiment of the invention, which formulates the seismogram separation problem as a novel constrained optimization problem (formally a convex cost optimization under convex constraints) and then solves the formulated problem using established methods in the area of optimization theory. In particular, a set of seismograms is sought such that the $L_P$ norm of seismogram's coefficients in some linear transform domain is minimized, while the seismograms also match the field records up to a predetermined error level. In broad terms, such an optimization problem is solved iteratively. During the iterations, a preliminary estimate of the separated seismograms is used in conjunction with the field data and the pilot sweep functions to determine a second set of updated seismograms that better satisfy the desired constraints.

One way to mathematically formulate the problem and to solve it is given next. To express the reformulated problem mathematically, the following notations are adopted. Let $\vec{G}$ denote a vector that comprises a collection of separated seismogram traces; let S denote the matrix, which is constructed with the pilot sweeps or the ground force functions, that converts the seismogram traces $\vec{G}$ into field form (as in Equation 20); and let $\vec{D}$ denote a vector comprising a collection of measured vibroseis data. Let T denote a matrix that transforms $\vec{G}$ into a domain where the $L_p$ norm would be measured. For example, T might first subject each trace in the seismogram to spherical divergence correction and then take the curvelet transform of a group of traces; $T\vec{G}$ would correspond to the transform domain coefficients of the seismograms. The problem then may be formulated as follows:

Find seismogram traces $\vec{G}$ that
1) Minimize the $L_p$ cost function $\|T\vec{G}\|_p$, where $\|.\|_p$ denotes the $L_p$ norm (with $1 \leq p \leq 2$ typically) of the transform domain coefficients of $\vec{G}$, and also
2) Match the field data $$\|R(\vec{D}-S\vec{G})\|_q < \lambda_1 \quad (36)$$

(see Equation 30, which is similar), where $\|.\|_q$ denotes the $L_q$ norm (with $q \geq 1$ typically) of the weighted difference, with R denoting an user-determined weighting function, and $\lambda_1$ an user-determined level of matching.

Those skilled in the art of optimization theory will recognize that for p=1 and q=2, the above problem is an $L_1$ minimization problem with quadratic constraints. Minimizing the $L_1$ implicitly exploits the sparsity of the seismograms in the transform domain T. Such a problem can be solved using any one of several algorithms from the field of optimization theory (see, for example, Chapters 4 and 11 in S. Boyd and L. Vandenberghe, *Convex Optimization*, Cambridge University Press (2004)).

For example, the problem described above with p=1 and q=2 can be recast as a second-order cone program ("SOCP"):

$$\min_{\vec{G},\vec{U}} \sum_l u_l \text{ subject to } \begin{aligned} T\vec{G} - \vec{U} &\leq 0 \\ -T\vec{G} - \vec{U} &\leq 0 \\ \|R(\vec{D}-S\vec{G})\|_2^2 - \lambda_1^2 &\leq 0 \end{aligned} \quad (37)$$

Figure 18:
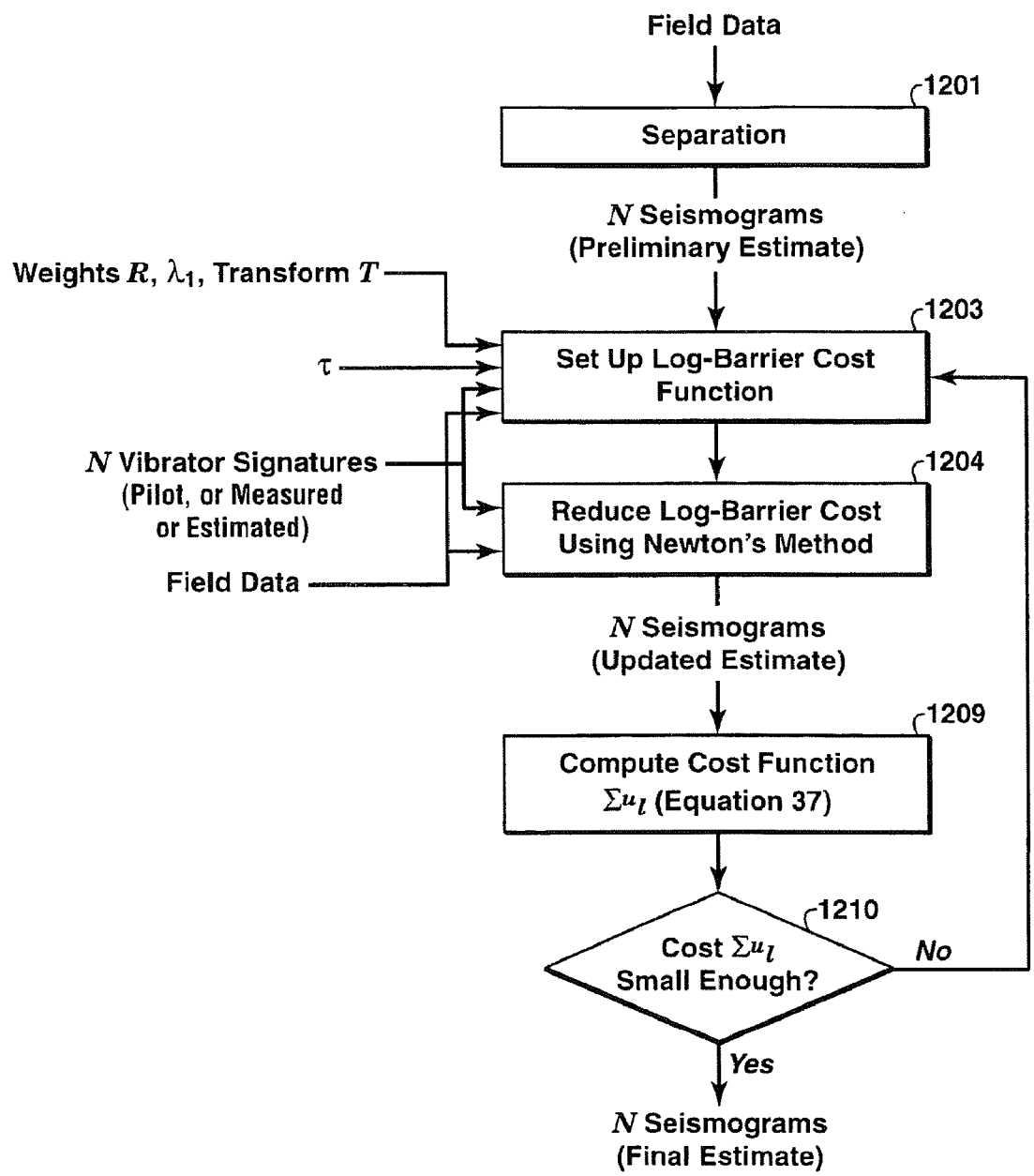
FIG. 18 is a flow chart of basic steps in a variation of the method of FIG. 17 that employs a log-barrier method from the field of optimization theory to solve an underlying second-order cone problem.

Above, the new variable $\vec{U}$ is a dummy vector introduced to convert the optimization problem into a standard SOCP problem. The summation is over all elements of $\vec{U}$, and the first two inequalities need to be satisfied by each element in the vector. The reformulated separation problem can then be solved using the well-known log-barrier method (see Chapter 11 in *Convex Optimization*). Alternatively, primal-dual techniques can also be employed to solve the problem. FIG. 18 shows a more detailed version of FIG. 17, directed toward using the log-barrier method to solve the SOCP. The basic steps are as follows:

1) Use the field data and vibrator signatures to set up a SOCP problem described in Equation 37. The weights R, transform T, and level of matching $\lambda_1$ are chosen based on prior information about the noise level and noise-free seismograms, thereby fully specifying the core optimization problem. The R and T may, for example, be constructed based on available or constructed templates for noise-free seismograms.
2) Obtain a preliminary estimate of the separated seismograms (step 1201 in FIG. 18) such that the estimate matches the data satisfactorily.
3) In step 1203 in FIG. 18, set up a log-barrier cost function of the following form $$\sum_l u_l - \frac{1}{\tau}\left(\begin{array}{c}\log(-T\vec{G}+\vec{U}) + \log(T\vec{G}+\vec{U}) + \\ \log(\|R(\vec{D}-S\vec{G})\|_2^2 - \lambda_1^2)\end{array}\right), \quad (38)$$

with $\tau$ a parameter that monotonically increases with the log-barrier algorithm iterations. This step corresponds to the first step of running the log-barrier iterations.

4) In step 1204, use Newton's method to minimize the Equation 38 with respect to $\vec{G}$ and $\vec{U}$, and update the seismograms. As a part of the update, Newton's method uses the preliminary seismograms after converting them to field form $S\vec{G}$. In addition, the Newton's method also computes gradients and Hessians to set up and solve a matrix equation.

5) The log-barrier iterations are terminated (typically after just a few iterations) when the term $$\sum_l u_l$$

does not change significantly (steps 1209 and 1210). More details about the log-barrier method can be found in Convex Optimization, Chapter 11.

A slightly different way to perform constrained optimization based can be done by setting up an alternate $L_1$ minimization problem with quadratic constraints. In this case, let T denote a matrix that transforms any set of coefficients $\vec{C}$ into a seismogram $\vec{G}$. That is, $$\vec{G} = T\vec{C}. \tag{39}$$

For example, T might be a transform that first takes the inverse curvelet transform of a set of coefficients, and then performs inverse spherical divergence correction to yield a seismogram estimate $\vec{G}$. Other symbols such as $\vec{G}$, S, are $\vec{D}$ denote the same quantities that were described above. This alternate $L_1$ minimization problem with quadratic constraints can be stated as follows:

Find a seismogram traces set of coefficients $\vec{C}$ that 1) minimizes the $L_1$ cost function $\|\vec{C}\|_1$, where $\|.\|_1$ denotes the $L_1$ norm of the transform domain coefficients and also
2) matches the field data $$\|R(\vec{D}-ST\vec{C})\|_2 < \lambda_1 \tag{40}$$

where $\|.\|_2$ denotes the $L_2$ norm of the weighted difference, with R denoting an user-determined weighting function, and $\lambda_1$ an user-determined level of matching. The separated seismograms are obtained from $\vec{C}$ and the equation $\vec{G} = T\vec{C}$.

The above problem can also be solved using established algorithms such as log-barrier methods from the field of optimization theory.

In addition to the conventional constrained optimization theory methods such as log-barrier methods, more recent iterative methods such as Orthogonal Matching Pursuit (OMP) (see Tropp and Gilbert, "Signal recovery from random measurements via Orthogonal Matching Pursuit," Download: http://www-personal.umich.edu/~jtropp for details (2006)); Matching Pursuit (see Mallat, *A Wavelet Tour of Signal Processing*, Academic Press, pg. 412 (1998)); Basis pursuit (see page 409 in the previous reference); group testing (see Cormode and Muthukrishnan, "Towards an algorithmic theory of compressed sensing", DIMACS Tech. Report 2005-40 (2005)); LASSO (see Tibshirani, "Regression shrinkage and selsection via the LASSO," *J. Royal. Statist. Soc B.*, 58(1), 267-288 (1996)); LARS (see Efron et al., "Least Angle Regression", *Ann. Statist.* 32(2), 407-499 (2004)); as well as expectation-maximization, Bayesian estimation algorithms, belief propagation, other seismogram structure exploiting algorithms or similar techniques referenced in these publications, could also be employed to solve the problem represented by equation (40) above.

For example, OMP is an iterative approach that seeks a sparse set of coefficients in a greedy fashion to satisfy an underdetermined linear equation. In the problem of equation (40), OMP would seek a sparse $\vec{C}$ that solves $R\vec{D} = RST\vec{C}$. During the OMP iterations, the previous iteration's estimate of $\vec{C}$ is used in conjunction with the survey data and each vibrator's signature to determine the residual error $\vec{D} - ST\vec{C}$. The next iteration adjusts the $\vec{C}$ to further minimize the residual error. Typically, OMP iterations are carried out until $\|R(\vec{D} - ST\vec{C})\|_2 = 0$. However, the OMP iterations can also be terminated as soon as the weighted, residual error satisfies equation (40).

Penalized Least Squares-Based Separation

Figure 19:
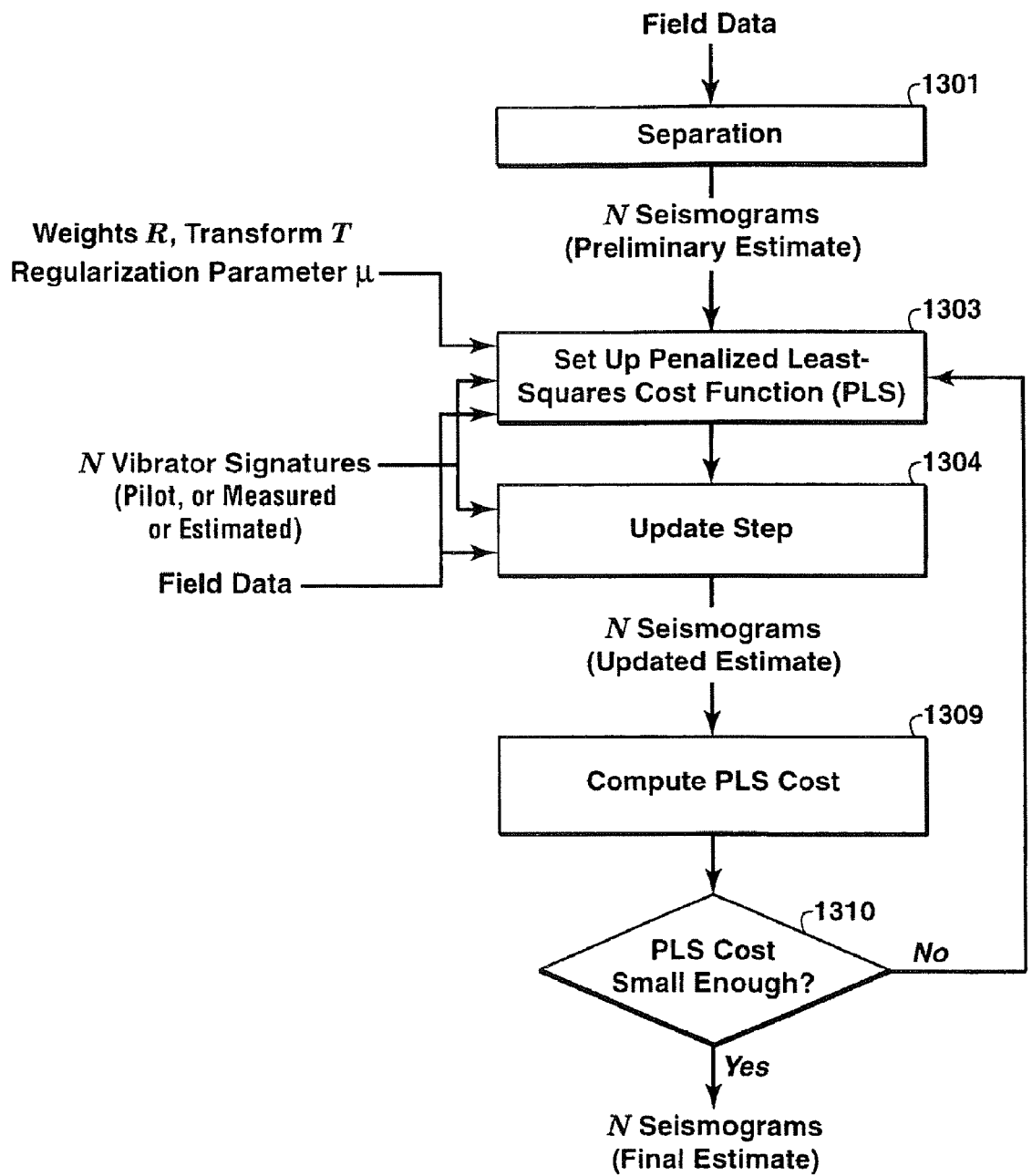
FIG. 19 is a flow chart of basic steps in an alternative embodiment of the present invention that sets up a penalized least square cost function and then minimizes the cost function.

A fourth way of performing step 202 of FIG. 8 is described in FIG. 19. Again, steps 1301, 1309 and 1310 correspond to steps 201, 209 and 210 in the flow chart of the general method, FIG. 8. Steps 1303 and 1304 indicate how step 202 in the general flow chart may be performed in this embodiment of the invention, which formulates the seismogram separation problem as a novel penalized least squares problem (step 1303) and then solves the formulated problem using established methods for solving penalized least-squares ("PLS") problems (step 1304). In particular, a set of seismograms is sought that minimizes a PLS cost function that comprises two terms: the first term measures the seismograms' match to the field data, and the second term measures the $L_p$ norm, preferably with $1 \leq p \leq 2$, of the seismogram's coefficients in some linear transform domain T. Choosing $p < 2$ exploits the sparsity of the seismograms in the transform domain T.

The problem may be stated mathematically using the following terminology (similar to that used in the previous section). Let $\vec{G}$ denote a vector that comprises a collection of separated seismogram traces; let S denote the matrix, which is constructed with the pilot sweeps or the ground force functions, that converts the seismogram traces $\vec{G}$ into field form (as in Equation 30); and let $\vec{D}$ denote a vector comprising a collection of measured vibroseis data. Let T denote a matrix that transforms $\vec{G}$ into a domain where the $L_p$ norm would be measured, and let R denote an user-determined weighting function. Then, the objective is to separate the seismograms by solving the following mathematical problem:

$$\min_{\vec{G}} \|R(\vec{D} - S\vec{G})\|_q^q + \mu\|T\vec{G}\|_p^p \tag{41}$$

Similar to the previous section, the weights R, transform T, and level of matching $\lambda_1$ can be chosen based on prior information about the noise level and noise-free seismograms or based on available or constructed templates for noise-free seismograms. If q=2 in Equation 41, the separation is commonly referred to as a PLS-based separation. If q=2 and p=2 in Equation 41, then the seismograms that solve Equation 41 have the following closed form expression $$\vec{G} = (S^T R^T RS + \mu T^T T)^{-1} S^T R^T R\vec{D}. \tag{42}$$

In practice, the seismograms can be obtained by evaluating the right hand side of Equation 42 using established iterative methods from numerical linear algebra. For example, the matrix inverse in Equation 42 is typically computed using conjugate gradients (See, for example, Ake Bjorck, *Numerical Methods for Least Squares Problem*, SIAM, Chapter 7 (1996)). During the iterations to compute the matrix inverse, preliminary seismogram estimates are converted to field form $S\vec{G}$ and then used to obtain updated seismograms.

However, if $q\neq 2$ or $p\neq 2$ in Equation 41, then the seismograms that solve Equation 41 do not have a closed form expression. In such cases, the cost function in Equation 41 needs to be optimized iteratively. All iterative approaches use a preliminary estimate of the seismograms in conjunction with the field data to produce an updated seismogram estimate. For example, a steepest-descent approach would employ the following steps:
1) Obtain a preliminary estimate of the separated seismograms.
2) Compute the gradient of Equation 41 at the preliminary seismogram value.
3) Update the seismograms by taking a small step in the direction of the computed gradient. As a part of the update step, the preliminary seismograms are converted to the field form $S\vec{G}$.

In contrast, an iteratively re-weighted least-squares approach would adopt the following steps when $q=2$:
1) Obtain a preliminary estimate $\vec{G}''$ of the separated seismograms.
2) Convert Equation 41 into a cost function with a comparable $L_2$ penalty term by using the preliminary seismogram estimate to update the cost function $$\min_{\vec{G}} \|R(\vec{D}-S\vec{G})\|_2^2 + \mu \left\| \frac{T\vec{G}}{(|T\vec{G}^n|^{1-p/2}+\varepsilon)} \right\|_2^2. \quad (43)$$

In Equation 43, the division in the second term is done element by element, and the constant s denotes a stabilizing term.
3) Solve Equation 43 by using the closed form expression in Equation 42 and obtain updated seismograms. As a part of solving Equation 43 iteratively, the preliminary seismograms are converted to the field form $S\vec{G}$.
4) Repeat from the first step to the above step until the seismograms are satisfactory (convergence).

A slightly different way to perform penalized least-squares based separation may be described by setting up an alternate PLS problem. In this case, let T denote a matrix that transforms any set of coefficients, say $\vec{C}$, into a seismogram $\vec{G}$. That is, $$\vec{G}=T\vec{C}. \quad (44)$$

In such a case, the following PLS problem may be posed:

$$\min_{\vec{C}} \|R(\vec{D}-ST\vec{C})\|_2^2 + \mu \|\vec{C}\|_p^p. \quad (45)$$

The separated seismograms are obtained from C that minimize Equation 45, using $\vec{G}=T\vec{C}$. The alternate PLS problem in Equation 45 can also be solved by invoking established methods from numerical linear algebra.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting updated seismograms may either be downloaded or saved to computer memory.

The invention claimed is:

1. A method for separating multiple-vibrator seismic data and reducing separation-related noise, said seismic data being recorded in an actual or simulated survey with N vibrators (N>1) operating simultaneously, with the number of sweeps per vibrator being fewer than N and the sweeps for each vibrator being different from the sweeps for the other vibrators in some manner, a sweep being defined as a period of continuous source energy radiation terminated by a listening time or other cessation of vibration for a time period at least as long as the two-way travel time of a seismic wave traveling from a vibrator down to a pre-selected deepest target of interest and back up to a seismic receiver, said method comprising:
(a) separating the survey data to obtain a preliminary estimate of N seismograms, one per vibrator; and
(b) adjusting the seismograms to match the survey data and to satisfy selected characteristics of noise-free seismograms, thereby producing N updated seismograms; wherein said adjusting comprises extracting that part of each seismogram that corresponds to signal, and using the extracted signal parts to generate an updated set of separated seismograms; and wherein the set of updated seismograms is generated by convolving each extracted signal part with its corresponding vibrator signature, then stacking all N results, subtracting that from the survey data, separating the result of that by vibrator, and for each vibrator adding that to the corresponding extracted signal part.

2. The method of claim 1, further comprising:
(c) testing the updated seismograms to determine a measure of error in fit compared to the survey data and the selected characteristics of noise-free seismograms; and
(d) repeating steps (b)-(d) as necessary until the error is less than a pre-selected value or another stopping point is reached.

3. The method of claim 1, wherein the number of sweeps per vibrator is one.

4. The method of claim 1, wherein the separation steps use a technique selected from a group consisting of damped inversion, HFVS (High Fidelity Vibratory Seismic) inversion, and cross correlation.

5. The method of claim 4, wherein the separation technique is damped inversion wherein inversion parameters are chosen such that the separated seismograms match the survey data in a weighted least-squares sense.

6. The method of claim 1, wherein the signal extraction is based on typical characteristics of noise-free seismograms.

7. The method of claim 6, wherein the typical characteristics of noise-free seismograms include at least one of a group consisting of (i) the amplitude of seismic events observed on a seismogram decay with increasing time, and (ii) seismic reflectors that appear on a group of adjacent seismogram traces are coherent.

8. The method of claim 7, wherein the typical characteristics of noise-free seismograms further include that the separated seismograms should not contain signal related to sources at the locations of the other vibrators by time of arrivals or dips.

9. The method of claim 6, wherein the signal extraction is performed either on a trace-by-trace basis in the time domain, or on a trace-by-trace basis after transforming each trace or collectively a group of traces to a different domain.

10. The method of claim 6, wherein the signal extraction is performed using a template for a noise-free seismogram.

11. The method of claim 1, wherein each vibrator's signature is either measured, or estimated, or the vibrator's pilot signal is used.

12. The method of claim 1, wherein the selected characteristics of noise-free seismograms comprise at least one of a group consisting of: (a) the seismograms' amplitudes decay with time; (b) reflections are coherent across adjacent seismogram traces; and (c) reflection times and dips are constrained by seismic source location.

13. A method for producing hydrocarbons from a subsurface region, comprising:
   (a) conducting a multiple vibrator seismic survey of the subsurface region with N vibrators (N>1) operating simultaneously, with the number of sweeps per vibrator being fewer than N and the sweeps for each vibrator being different from the sweeps for the other vibrators in some manner, a sweep being defined as a period of continuous source energy radiation terminated by a listening time or other cessation of vibration for a time period at least as long as the two-way travel time of a seismic wave traveling from a vibrator down to a pre-selected deepest target of interest and back up to a seismic receiver;
   (b) obtaining N separated seismograms wherein separation-caused noise has been reduced by a method of claim 1;
   (c) drilling a well to a formation interpreted in the N updated seismograms as potentially hydrocarbon bearing; and
   (d) producing hydrocarbons from the well.

14. A method for separating multiple-vibrator seismic data and reducing separation-related noise, said seismic data being recorded in an actual or simulated survey with N vibrators (N>1) operating simultaneously, with the number of sweeps per vibrator being fewer than N and the sweeps for each vibrator being different from the sweeps for the other vibrators in some manner, a sweep being defined as a period of continuous source energy radiation terminated by a listening time or other cessation of vibration for a time period at least as long as the two-way travel time of a seismic wave traveling from a vibrator down to a pre-selected deepest target of interest and back up to a seismic receiver, said method comprising:
   (a) separating the survey data to obtain a preliminary estimate of N seismograms, one per vibrator; and
   (b) adjusting the seismograms to match the survey data and to satisfy selected characteristics of noise-free seismograms, thereby producing N updated seismograms; wherein said adjusting comprises extracting parts of each seismogram, based on a model of the way in which noise is manifested in the survey data and using the extracted parts to generate an updated set of separated seismograms; and wherein the set of updated seismograms is generated by convolving each extracted part with its corresponding vibrator signature, then stacking all N results, performing an operation on the stacked results, and subtracting that from the survey data, then separating the result of that by vibrator using the noise-reduced record to obtain improved separation of the seismograms.

15. The method of claim 14, wherein the operation is a time shift or a filter.

16. The method of claim 14, wherein each vibrator's signature is either measured, or estimated, or the vibrator's pilot signal is used.

17. The method of claim 14, wherein the selected characteristics of noise-free seismograms comprise at least one of a group consisting of: (i) the seismograms' amplitudes decay with time; (ii) reflections are coherent across adjacent seismogram traces; and (iii) reflection times and dips are constrained by seismic source location.

18. A method for separating multiple-vibrator seismic data and reducing separation-related noise, said seismic data being recorded in an actual or simulated survey with N vibrators (N>1) operating simultaneously, with the number of sweeps per vibrator being fewer than N and the sweeps for each vibrator being different from the sweeps for the other vibrators in some manner, a sweep being defined as a period of continuous source energy radiation terminated by a listening time or other cessation of vibration for a time period at least as long as the two-way travel time of a seismic wave traveling from a vibrator down to a pre-selected deepest target of interest and back up to a seismic receiver, said method comprising:
   (a) separating the survey data to obtain a preliminary estimate of N seismograms, one per vibrator; and
   (b) adjusting the seismograms to match the survey data and to satisfy selected characteristics of noise-free seismograms, thereby producing N updated seismograms; wherein the adjusting comprises using the preliminary estimate of the separated seismograms in conjunction with the survey data and each vibrator's signature to determine an updated set of updated seismograms using constrained optimization theory.

19. The method of claim 18, wherein the constrained optimization theory uses L1 minimization under quadratic constraint.

20. The method of claim 18, wherein the constrained optimization theory employs a log-barrier method which is used to perform seismogram separation formulated as a second-order cone program.

21. The method of claim 18, wherein each vibrator's signature is either measured, or estimated, or the vibrator's pilot signal is used.

22. The method of claim 18, wherein the selected characteristics of noise-free seismograms comprise at least one of a group consisting of: (i) the seismograms' amplitudes decay with time; (ii) reflections are coherent across adjacent seismogram traces; and (iii) reflection times and dips are constrained by seismic source location.

* * * * *